US012206872B2

United States Patent
Yu et al.

(10) Patent No.: US 12,206,872 B2
(45) Date of Patent: Jan. 21, 2025

(54) METHOD FOR PROCESSING VIDEO DATA STREAM, VIDEO DECODING APPARATUS, AND METHOD FOR ENCODING DATA STREAM

(71) Applicants: ZHEJIANG UNIVERSITY, Zhejiang (CN); GUANGDONG OPPO MOBILE TELECOMMUNICATIONS CORP., LTD., Guangdong (CN)

(72) Inventors: Lu Yu, Guangdong (CN); Chuchu Wang, Guangdong (CN); Sicheng Li, Guangdong (CN); Zhihuang Xie, Guangdong (CN); Zhenyu Dai, Guangdong (CN)

(73) Assignees: ZHEJIANG UNIVERSITY, Zhejiang (CN); GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 54 days.

(21) Appl. No.: 18/344,815

(22) Filed: Jun. 29, 2023

(65) Prior Publication Data

US 2023/0345020 A1 Oct. 26, 2023

Related U.S. Application Data

(63) Continuation of application No. PCT/CN2021/070163, filed on Jan. 4, 2021.

(51) Int. Cl.
*H04N 19/30* (2014.01)
*G06T 5/50* (2006.01)
(Continued)

(52) U.S. Cl.
CPC ............... *H04N 19/30* (2014.11); *G06T 5/50* (2013.01); *G06T 7/50* (2017.01); *H04N 7/013* (2013.01);
(Continued)

(58) Field of Classification Search
CPC ...... H04N 19/30; H04N 19/176; H04N 19/46; H04N 7/013; G06T 7/50; G06T 5/50; G06T 2207/2022
See application file for complete search history.

(56) References Cited

U.S. PATENT DOCUMENTS 10,055,876 B2  8/2018  Ford et al.
2009/0289937 A1  11/2009  Flake et al.
(Continued)

FOREIGN PATENT DOCUMENTS

| CN | 107851195 | 3/2018 |
|----|-----------|--------|
| CN | 111127536 | 5/2020 |
| EP | 3709273   | 9/2020 |

(Continued)

OTHER PUBLICATIONS

Shade et al., "Layered depth images," Computer Graphics Proceedings, Annual Conference Series (SIGGRAPH 98), Jul. 1998.
(Continued)

*Primary Examiner* — Jae N Noh
(74) *Attorney, Agent, or Firm* — Hodgson Russ LLP

(57) ABSTRACT

A method for processing a video data stream, a video decoding apparatus, and a method for encoding data stream are provided. The method includes: receiving a video data stream; generating a layer list using at least the patch-layer association information, the layer list including a first layer associated with the first view, the first layer being based on a first depth of the first view; assigning a first layer identification to the first layer; updating the view list section by adding the first layer as a second view; selecting a first target (Continued)

view for rendering on an output device; selecting one or more patches using at least the layer list and the patch list section; combining the selected one or more patches to form a first intermediate output frame; and performing post processing using at least the view list section.

20 Claims, 17 Drawing Sheets

(51) Int. Cl.
    *G06T 7/50*     (2017.01)
    *H04N 7/01*     (2006.01)
    *H04N 19/176*     (2014.01)
    *H04N 19/46*     (2014.01)

(52) U.S. Cl.
    CPC ........... *H04N 19/176* (2014.11); *H04N 19/46* (2014.11); *G06T 2207/20221* (2013.01)

(56) References Cited

U.S. PATENT DOCUMENTS

2021/0099687 A1* 4/2021 Shin ................ H04N 19/37
2022/0122217 A1* 4/2022 Lee ................ G06T 9/001

FOREIGN PATENT DOCUMENTS

| WO | 2020141258 | 7/2020 |
| WO | 2022069522 | 4/2022 |

OTHER PUBLICATIONS

Park et al., "Efficient Depth Compression Based on Partial Surface for 3-D Object Represented by Layered Depth Image," IEEE Signal Processing Letters, Oct. 2010, vol. 17, No. 10.

Seitz et al., "Photorealistic scene reconstruction by voxel coloring," Proceedings of the Computer Vision and Pattern Recognition Conference, 1997.

Zhou et al., "Stereo magnification: Learning view synthesis using multiplane images," ACM Trans. Graph., Aug. 2018, vol. 37, No. 4, article 65.

Tucker et al., "Single-View View Synthesis With Multiplane Images," 2020 IEEE/CVF Conference on Computer Vision and Pattern Recognition (CVPR), 2020.

"Potential Improvements of MIV," ISO/IEC JTC 1/SC 29/WG 4 N00004, Nov. 2020.

"Text of ISO/IEC CD 23090-5 Visual Volumetric Video-based Coding and Video-based Point Cloud Compression 2nd Edition," ISO/IEC JTC 1/SC 29/WG 7 N0003, Nov. 2020.

WIPO, International Search Report and Written Opinion for International Application No. PCT/CN2021/070163, Oct. 11, 2021.

Boyce et al., "MPEG Immersive Video Coding Standard," Proceedings of the IEEE, Jan. 2021.

Janus et al., "Multi-Plane Image Video Compression," IEEE 22nd International Workshop on Multimedia Signal Processing (MMSP), Sep. 2020.

EPO, Extended European Search Report for EP Application No. 21912419.5, Aug. 13, 2024.

* cited by examiner

METHOD FOR PROCESSING VIDEO DATA STREAM, VIDEO DECODING APPARATUS, AND METHOD FOR ENCODING DATA STREAM

CROSS-REFERENCE TO RELATED APPLICATION

This application is a continuation of International Application No. PCT/CN2021/070163, filed Jan. 4, 2021, the entire disclosure of which is incorporated herein by reference.

BACKGROUND

The present invention is directed to video processing techniques and systems thereof.

Over recent years, digital video technologies have improved in many ways. Video capturing devices are generating content in increasingly higher resolutions, and high-definition displays—moving from 1080P to 4K resolution and higher resolutions—have become a standard. Additionally, immersive video content is gaining wide acceptance with the advent of three-dimensional (3D), augmented reality (AR), and virtual reality (VR) applications. Volumetric content is often desired and sometimes required for these applications. For example, MPEG immersive video (MIV) format has been proposed to store and transport volumetric video contents with visual volumetric video-based coding (V3C) format. For example, a V3C video data stream typically includes texture data, depth data, and meta data. Texture and depth data images are stored as patches in one or more atlases, which are two-dimensional (2D) placeholders with predetermined dimensions for storing patches.

Existing immersive video formats and variants thereof feature many video processing techniques, but they have been inadequate. Therefore, improved methods and systems for processing video streams are desired.

SUMMARY

In a first aspect, a method for processing a video data stream is provided. The method includes receiving a video data stream. The data stream including a first data unit, which includes a metadata section and a data section. The metadata section includes a view list section and a patch list section. The data section includes a first atlas. The first atlas including a first patch and a second patch. The view list section including a first view and a first plurality of view parameters associated with the first view. The patch list section including a first plurality of patch parameters associated with the first patch and a second plurality of patch parameters associated with the second patch. The first plurality of patch parameters including patch-layer association information. The method also includes generating a layer list using at least the patch-layer association information. The layer list includes a first layer associated with the first view. The first layer is based on a first depth of the first view. The method further includes assigning a first layer identification to the first layer; updating the view list section by adding the first layer as a second view; selecting a first target view for rendering on an output device; selecting one or more patches using at least the layer list and the patch list section; combining the selected one or more patches to form a first intermediate output frame; and performing post processing using at least the view list section.

In a second aspect, a video decoding apparatus is provided. The apparatus includes an input interface configured to receive a video data stream; a first buffer memory for storing a first data unit of the video data stream, the first data unit including a metadata section and a data section, the metadata section including a view list section and a patch list section, the data section including a first atlas, the first atlas including a first patch and a second patch, the view list section including a first view and a first plurality of view parameters associated with the first view, the patch list section including a first plurality of patch parameters associated with the first patch and a second plurality of patch parameters associated with the second patch, the first plurality of patch parameters including patch-layer association information; a processor configured to access the first buffer memory and process the metadata section to add a layer list section using at least the patch-layer association information, the layer list section including a first layer and first plurality of layer parameters, the first layer being associated with the first view, the processor is further configured to assign a first layer identification to the first layer; a rendering engine configured to select a first target view and generate a first intermediate output image for the first target view, the first intermediate output image being associated with the first data unit, the rendering engine further being configured to select and combine one or more patches for the first target view based at least on the layer list section, the first intermediate output image being based on combined one or more of the patches; a second buffer memory configured to store the first intermediate output image; and an output interface configured to transmit the first intermediate output image.

In a third aspect, a method for encoding data is provided. The method includes receiving a video data unit. The video data unit includes a first metadata section and a video data section. The first metadata section includes at least view parameters. The method also includes determining a multi-plane data type associated with the video data section. The method further includes processing the video data section to obtain a plurality of depth values. The method also includes generating a plurality of layers corresponding to the plurality of depth values. The plurality of layers including a first layer. The method also includes generating a plurality of patches based using at least the video data section. The plurality of patches includes a first patch. The method also includes determining a first association between the first layer and the first patch. The method also includes storing the first association at a second metadata section. The method also includes encoding the second metadata section.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION

Figure 1:
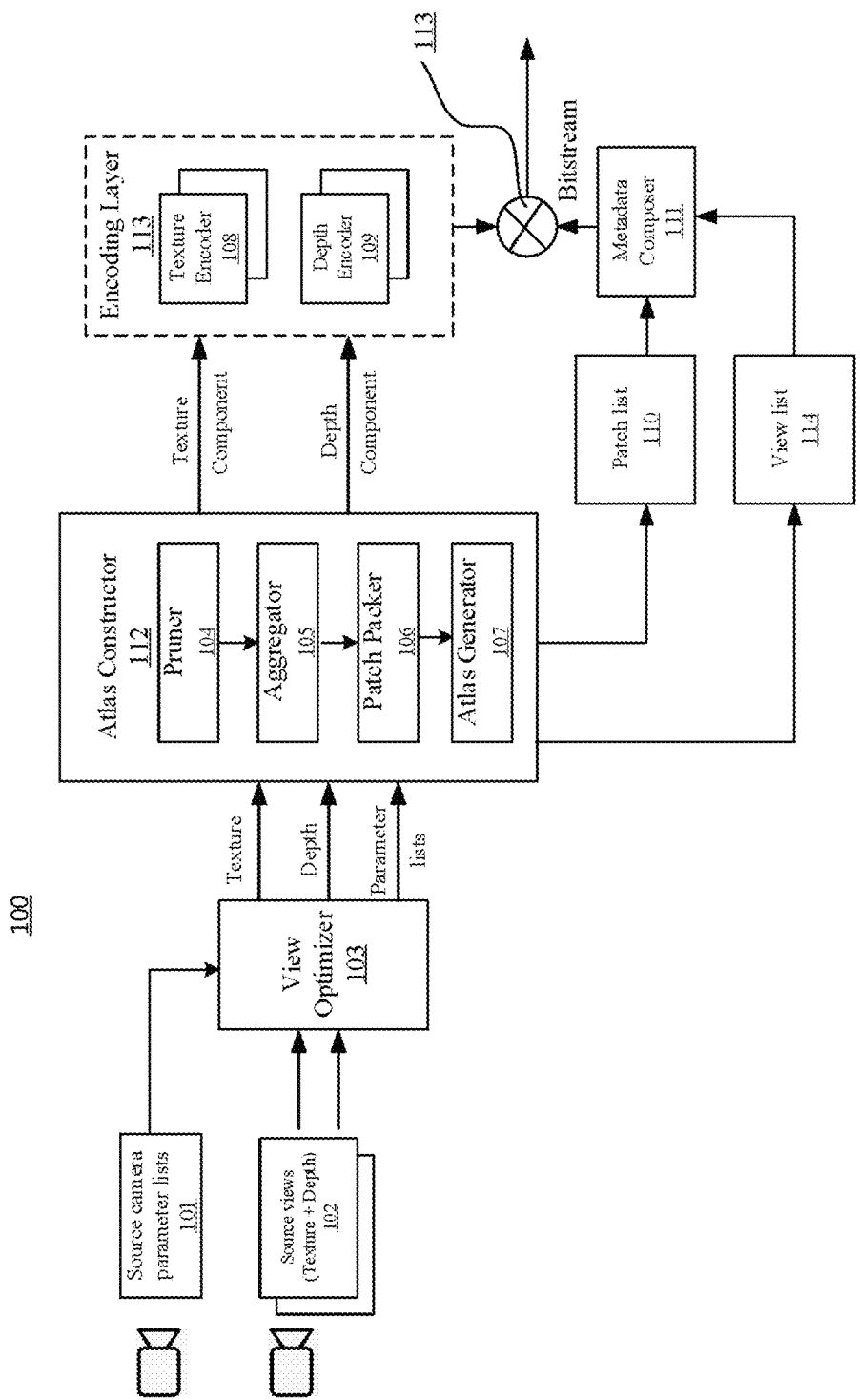
FIG. 1 is a simplified block diagram illustrating a video encoding process process according to embodiments of the present invention.

The present invention is directed to video processing techniques. A specific embodiment provides a video processing method. A frame of a video stream, which includes a metadata section and a video data section, is processed. The metadata section includes a view list section and a patch list section. A layer list is generated at least based on layer patch association information. The layer list includes parameters indicating associations between layers and views. The patch list section includes parameters indicating the association between layers and patches. During rendering processes, patches for a target view are selected using at least the layer list parameters and patch list parameters.

The following description is presented to enable one of ordinary skill in the art to make and use the invention and to incorporate it in the context of particular applications. Various modifications, as well as a variety of uses in different applications, will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object.

FIG. 1 is a simplified block diagram illustrating a video encoding process according to embodiments of the present invention. This diagram is merely an example, which should not unduly limit the scope of the claims. One of ordinary skill in the art would recognize many variations, alternatives, and modifications. Encoding process 100 starts with the acquisition of one or more frames. For example, the encoding process 100 might follow an MPEG Immersive Video (MIV) standard. A video bitstream, as being encoded, is a collection of time-coded video frames (e.g., stored as fragment or "patches") accompanied by metadata. For example, a frame may be a volumetric frame. Each frame is associated with one or more source views (e.g., source views 102 are associated with their respective video capturing devices). A source view camera may be a real or virtual camera. Commonly, multiple source views captured by multiple source cameras can be configured to reconstruct a 360° scene around a predetermined target view through image rendering technology. The source views 102 collected by the source cameras and a source camera parameter list 101 are received by a video encoder. A video encoder is configured to process the video contents associated with source views 102 and the metadata associated with these video contents. For example, the video encoder may be configured to transform video into preferred volumetric formats. Video encoding often involves optimization and compression that helps transmission and storage. The video encoding process and format significantly impact the subsequent decoding and rendering processes. For example, video encoding can be performed using the High-Efficiency Video Coding (HEVC) codec, or others. The source camera parameter list 101 may include both extrinsic camera parameters (e.g., position, orientation, etc.) and intrinsic camera parameters (e.g., EXIF, and others). Video contents generated by source views 102 may include both texture maps and depth maps. For example, a source view may comprise one or more layers that are sampled at a different depth from the perspective of the corresponding source view. The source view comprising multiple layers may be in Multiplane Image (MPI) format, Layered Depth Image (LDI) format, or others.

View optimizer 103 processes both video content (e.g., the texture attribute map and the depth map) and metadata (e.g., source camera parameters and other information). The optimization process involves (1) selecting one or more basic views, and (2) pruning the non-basic views by projecting them against the selected basic views and/or the previously pruned non-basic views. Atlas constructor 112 is configured to generate one or more atlases based on the input from the view optimizer 103. For example, an atlas—as used in the context of MIV—can be a place holder with a predetermined size for storing patches.

The atlas constructor 112, as shown, includes a pruner 104, an aggregator 105, a patch packer 106, and an atlas generator 107. The pruner 104 is configured to identify and remove the redundancies between the views. Identification of redundancies may be realized by re-projecting each depth pixel value of the non-basic view onto each basic view to validate (or invalidate) the pixel. A sample of the non-basic view (i.e., a collection of consistent pixels) may be pruned if it is already covered by a sample of the basic view or a previous non-basic view. The aggregator 105 is be configured to accumulate the pruning results of the pruner 104 over an intra-period (e.g., preset collection of frames) to account for motion. By the end of each intra-period, a clustering technique is applied to extract one or more 2D bounding boxes around patches containing volumetric information (e.g., texture components, and depth components). Patch packer 106 is be configured to sequentially fit 2D patch bounding boxes into one or more atlases. Atlas generator 107 is configured to generate one or more atlases, each of which contains a collection of patches. View list 114—configured as metadata—contains source camera parameters (e.g., the number of views, how each view is positioned and oriented in space, etc.). Patch list 110 contains patch parameters (e.g., the position of each patch, the association between each patch and its corresponding view, etc.) that are configured as metadata within bitstream 113 for transmission and decoding. It is to be noted that patches are generally grouped based on their associations with views, but patches belonging to the same view are not differentiated by the layers to which they belong. According to various embodiments, layers are generated and linked to patches. Texture encoder 108 is configured to encode the texture component of each patch for further transmission and decoding. A depth encoder 109 is configured to encode the depth component of each patch for further transmission and decoding.

According to various embodiments, encoding process 100 generates and utilizes layer information. For example, when atlas constructor 112 uses depth information from video or image contents to determine layers that are to be assigned to patches. For example, layers depth values may be calculated based on predetermined depth ranges (e.g., average between upper and lower ranges). When patch packer 106 generate patches for atlases, layer-patch association information is generated for each patch. In various implementations, patch list 110 includes patch parameters, some of which indicate association between patches and their respective layers, but the layer information is not organized into a layer list that facilitates decoding and rendering. For example, as described below, a layer list metadata section (or an equivalent) is generated during the decoding process.

Figure 2:
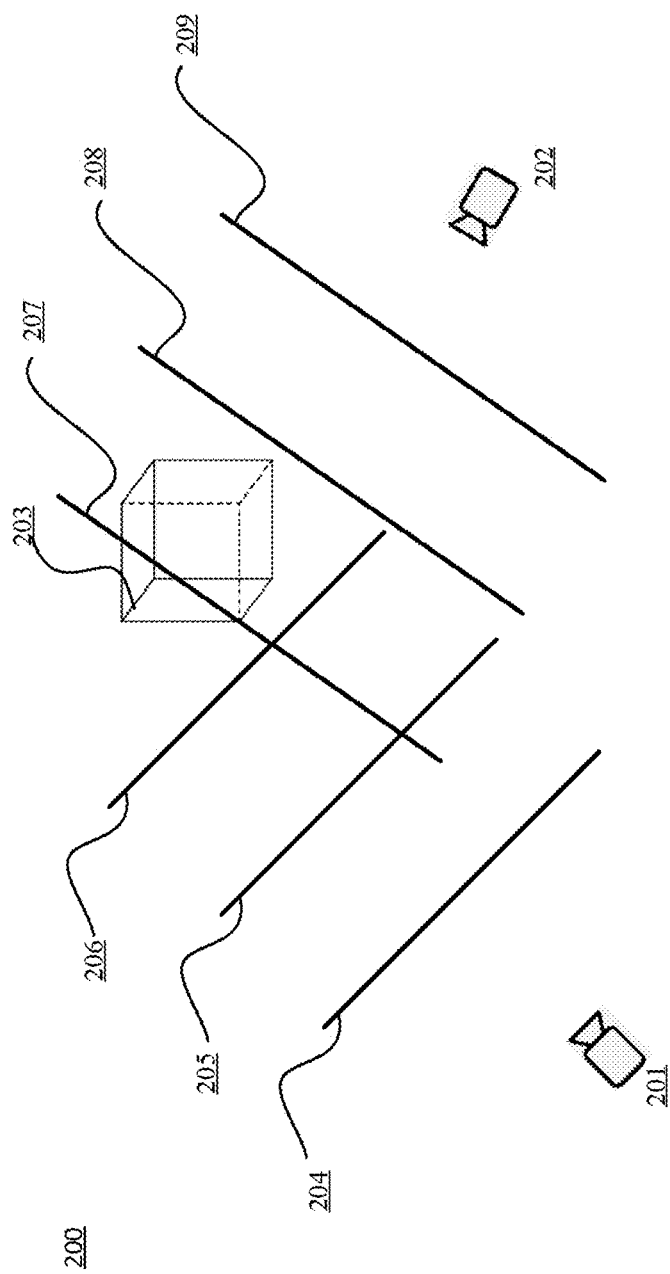
FIG. 2 is a simplified diagram illustrating camera views and their respective layers in a video stream process according to embodiments of the present invention.

FIG. 2 is a simplified diagram illustrating camera views and their respective layers in a video stream according to embodiments of the present invention. This diagram is merely an example, which should not unduly limit the scope of the claims. One of ordinary skill in the art would recognize many variations, alternatives, and modifications. As an example, the video content captured by source view 201 (in the direction of object 203) comprises layers 204, 205, and 206 that are associated with at different depths relative to the perspective of source view 201. In certain implementations, video encoding techniques—once MPI or LDI content is detected—determines layers associated with depth ranges. For example, each layer contains a frame obtained by projecting a part of the 3D scene within the layer on the corresponding source view camera (e.g., view 201) at the given perspective. In various implementations, each layer represents a range of depth and is characterized by a layer depth value. For example, a layer depth value is the average depth value of the depth range represented by the layer. Similarly, video content captured (or generated) by view 202 includes layers 207, 208, and 209. It is to be noted, each view includes at least a single layer (i.e., everything on the same plane). Layers are uniquely associated with their respective views. For example, the projection of object 203 may be associated with layer 206 (the third layer) of view 201, but it is also associated with layer 208 (the second layer) of view 202. During the video encoding process, layer information and layer texture information may be both used to calculate the coordinate of object 203 within the context of the MIV data stream.

Figure 3:
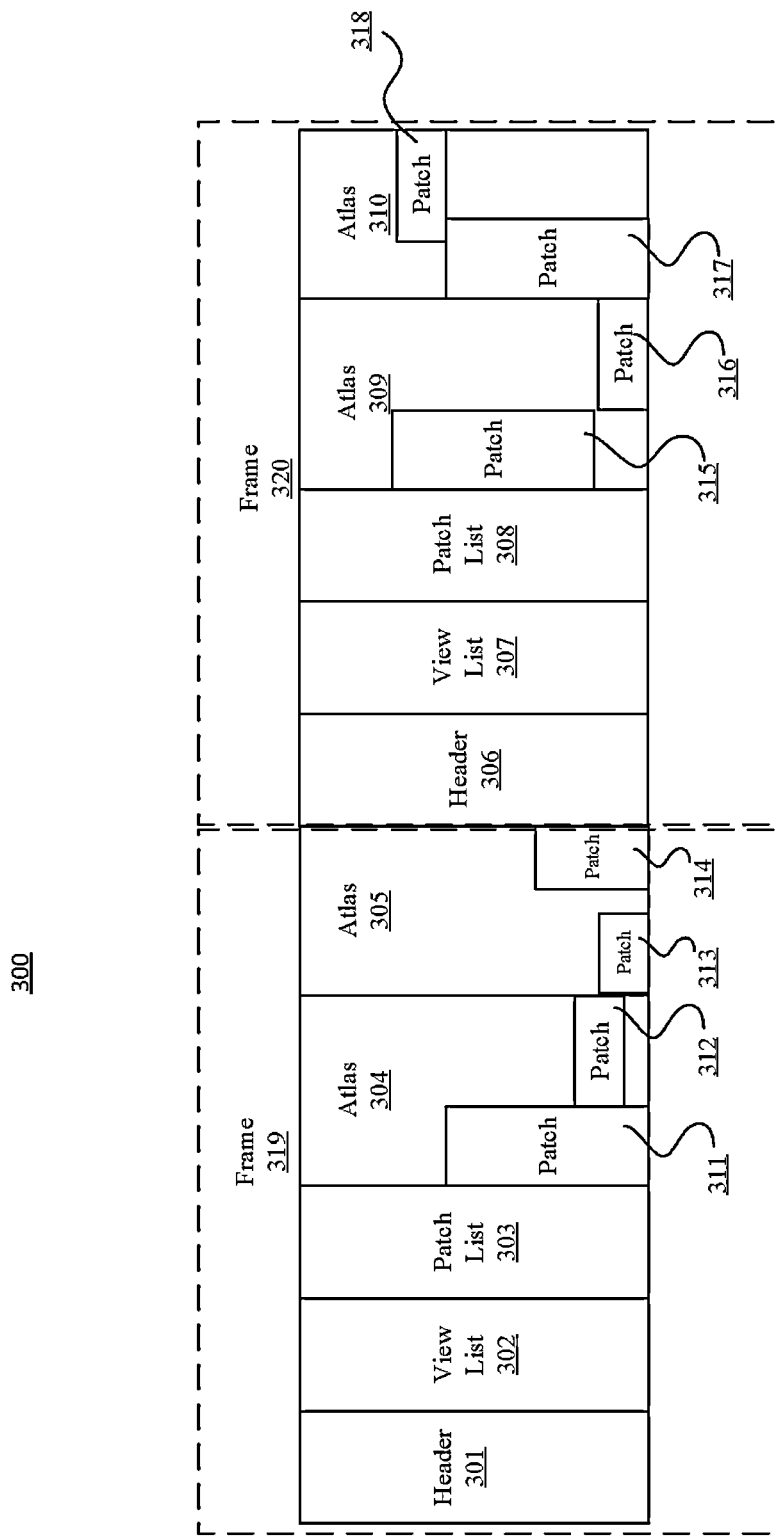
FIG. 3 is a simplified diagram illustrating an exemplary data structure for a video bitstream process according to embodiments of the present invention.

FIG. 3 is a simplified diagram illustrating an exemplary data structure for a video bitstream according to embodiments of the present invention. This diagram is merely an example, which should not unduly limit the scope of the claims. One of ordinary skill in the art would recognize many variations, alternatives, and modifications. As explained above, a video bitstream is a collection of time-coded video frames. Generally, each video frame includes metadata and video data. Each frame includes metadata and video content. For example, a frame may refer to a data unit in an encoded data stream. As an example, frame 319 comprises a data structure that includes header 301, view list 302, and patch list 303 as metadata. Video contents—a collection of patches after pruning—are stored in atlas 304 and atlas 305. Patch list 303 contains information (e.g., patch parameters) associated with the patches. In various embodiments, association between patches and layers are stored—as patch parameter—at the patch list 303. In certain implementations, patch list 303 is encapsulated as atlas metadata. View list 302 includes view parameters that are usually helpful in video rendering processes. It is to be noted that frame 319 does not include layer-related metadata stored as a layer list section, which can be useful in video decoding and rendering. As an example, frame 320 is structured similarly to frame 319, and it includes header 360, view list section 307, patch list section 308. Atlas 309 include patch 315 and patch 316. Atlas 310 includes patch 317 and patch 318. It is to be understood that patches in FIG. 3 are examples showing patch arrangement relative to an atlas, and their positions in atlases as shown do not necessarily correspond to their position in a video bitstream.

Figure 4A:
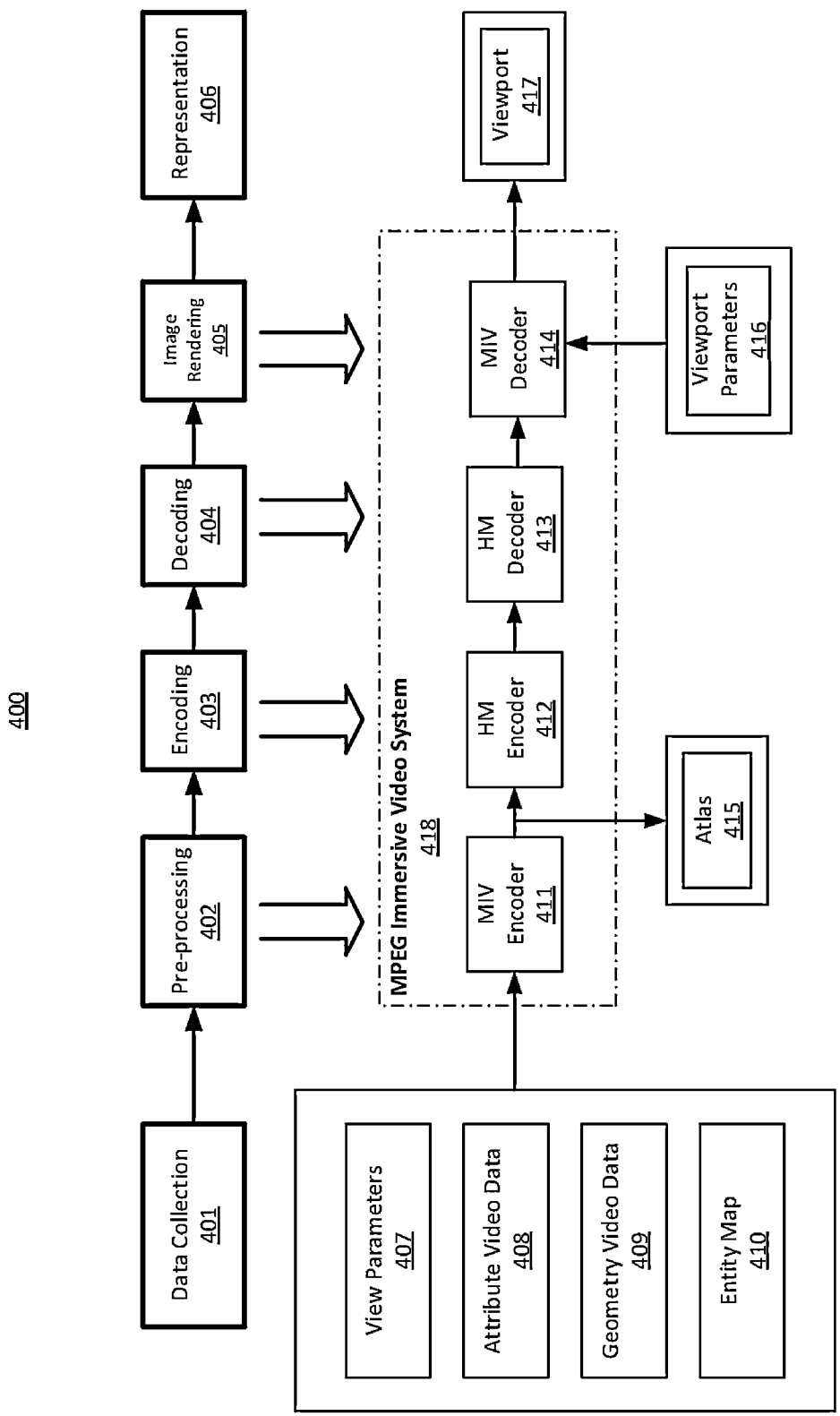
FIG. 4A is a simplified block diagram illustrating an MIV system process according to embodiments of the present invention.

FIG. 4A is a simplified block diagram illustrating an MIV system according to embodiments of the present invention. As an example, data collection block 401 may correspond the video capturing (e.g., camera or camcorder) or video creation (3D computer graphic generation). As a part of data collection process, view parameters 407, attributed video data 408, geometry video data 409, and entity map 410 are stored into a data structure. MPEG immersive video system 418 includes, among other features, MIV encoder 411, HM encoder 412, HM decoder 413, and MIV decoder 414. MIV encoder 411 is configured to perform pre-processing—at block 402—and generates an atlas 415. For example, metadata information, including view and patch parameters, are generated at block 402. In various embodiments, MIV encoder 411 also determines layers and their association to patches, and layer-patch association can be stored as patch parameter metadata.

A high-efficiency (HM) HM encoder 412 performs video encoding, at block 403. For example, HM encoding process is sometime referred to as high efficiency video encoding (HEVC). For example, an HEVC video bitstream—efficient and suitable for transport and storage—is generated at block 403. The encoded video is decoded at block 404, by HM decoder 413. The HM decoded video is then processed by MIV decoder 414, at image rendering block 405. For example, MIV decoder 414 uses various metadata parameters stored at block 416 for the image rendering process. Viewport 417 (e.g., display unit, VR unit, etc.) provides a representation at block 406.

Figure 4B:
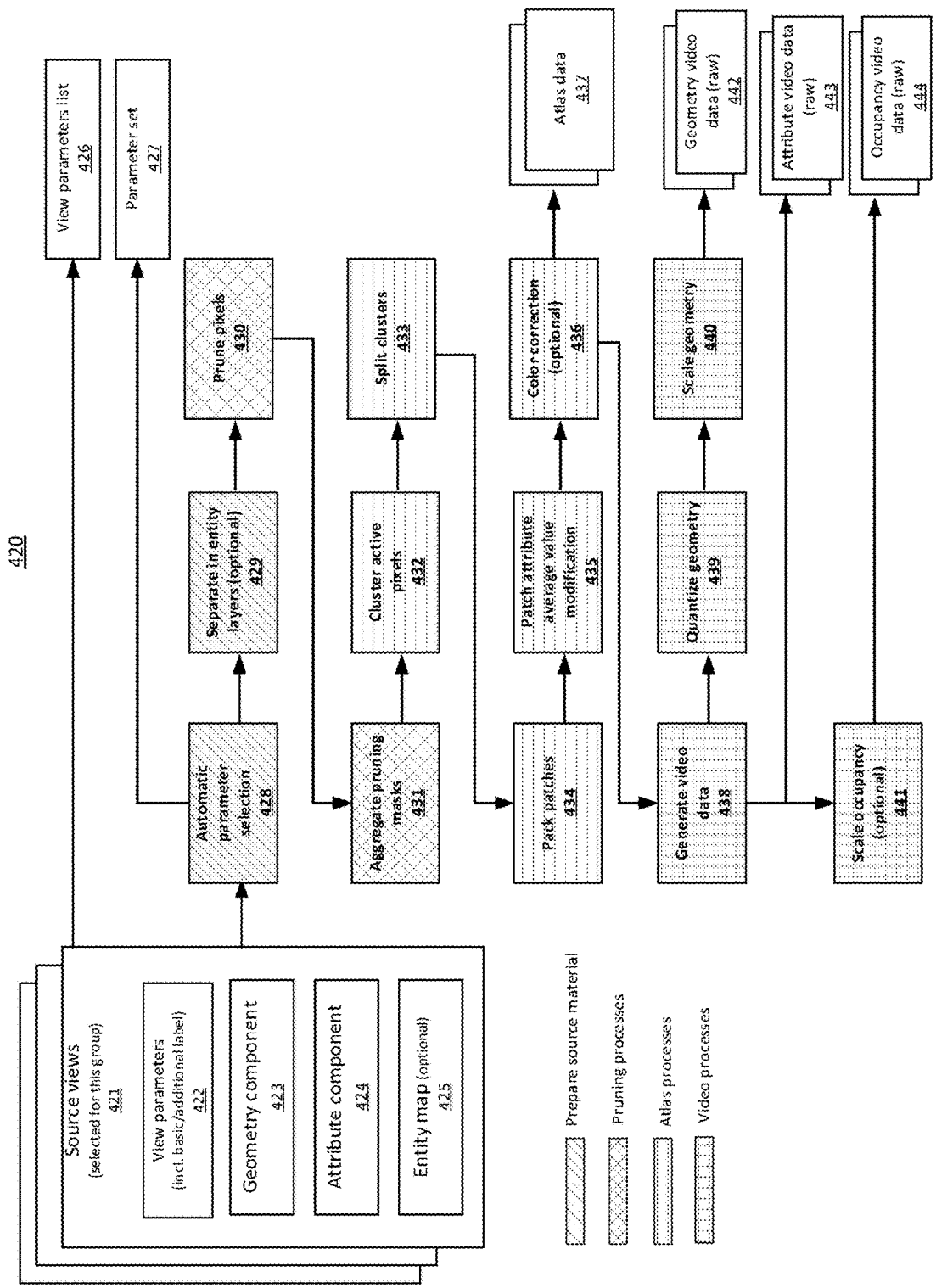
FIG. 4B is a simplified block diagram illustrating an MIV encoding process process according to embodiments of the present invention.

FIG. 4B is a simplified block diagram illustrating an MIV encoding process according to embodiments of the present invention. For example, MIV encoding can be performed by MIV encoder 411 illustrated in FIG. 4A. The input data (e.g., obtained during data collection process) are grouped as source views 421, which includes view parameters 422, geometry component 423, attribute component 424, and entity map 425. The processing of input data can be divided into four large steps: (1) prepare source material (block 428-429), (2) pruning (blocks 430-431), (3) atlas processes (steps 432-434) generating atlas data 437, and (4) video processes (438-441). In various implementations, layers and their association with patches are determined at block 434. For example, view parameters list 426 may be generated as a part of the input data, and parameter set 427 is generated at block 428. For example, geometry video data 442, attribute video data 443, and occupancy video data 44r are generated by the video processes.

Figure 4C:
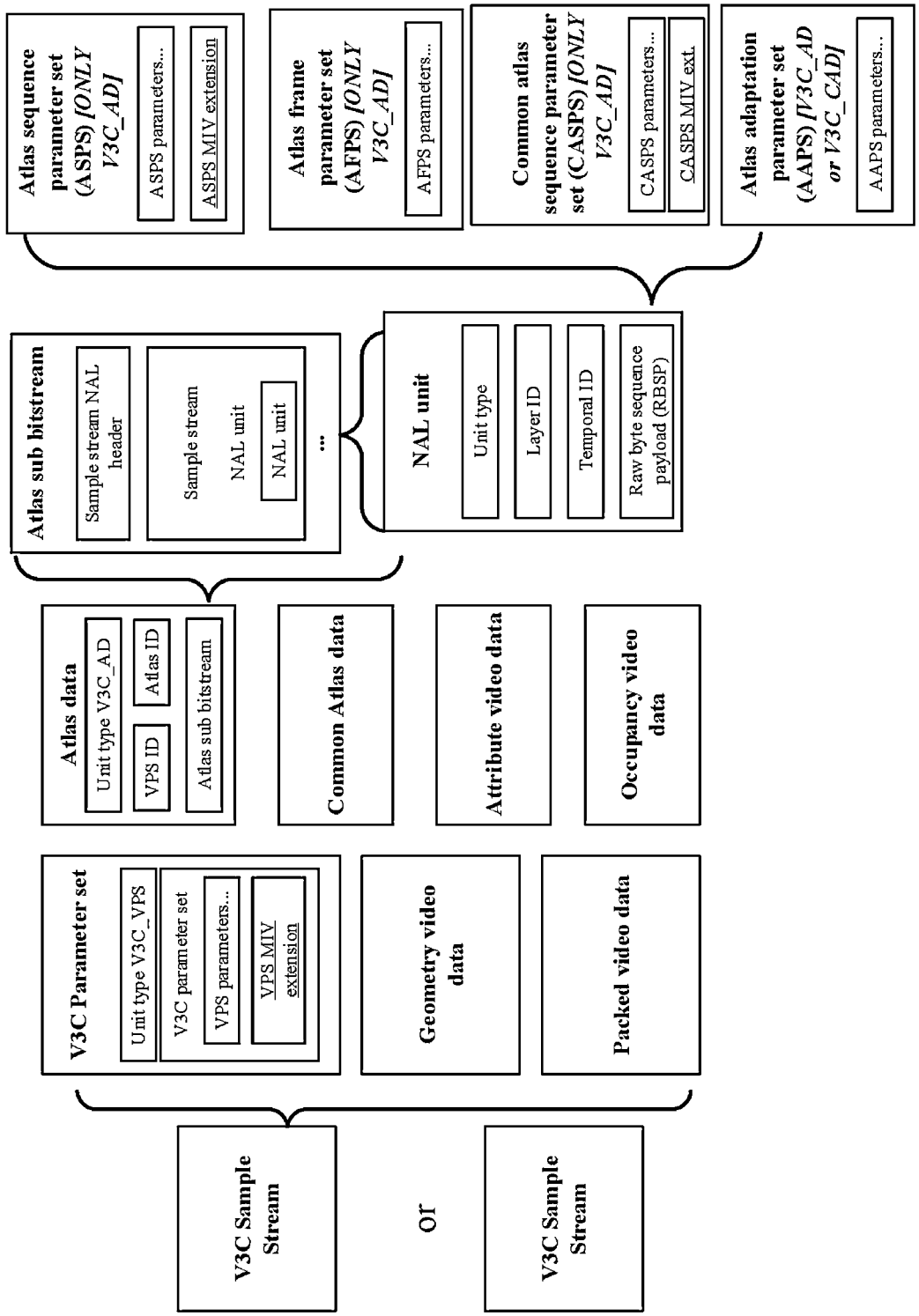
FIG. 4C is a simplified block diagram illustrating a data structure with MIV information for a video bitstream process according to embodiments of the present invention.

FIG. 4C is a simplified block diagram illustrating a data structure with MIV information for a video bitstream according to embodiments of the present invention. For example, the data structure is for a V3C data stream. It is to be understood that one or more data blocks may be added, removed, modified, replaced, or rearranged in actual implementations. For illustration, a V3C data stream includes data blocks corresponding to video frames (with corresponding time code). Each video frame includes a metadata section and an image data section, as illustrated in FIG. 3 and described above. An important aspect of the V3C data stream, as shown in FIG. 4C, is the MIV-specific data and metadata therefor. For example, the MIV format refers to MPEG Immersive Video. MIV allows for volumetric (or three dimensional) rendering of image and video. Among others, volumetric rendering requires the use of depth information in one way or another. And the depth information can be collected and encoded in the V3C data stream at various predetermined locations. It is to be noted that the layers that are determined from depth information and associated with patches, as described in various embodiments, may be different from the layers referred to as "layer ID" of the NAL unit.

Figure 5:
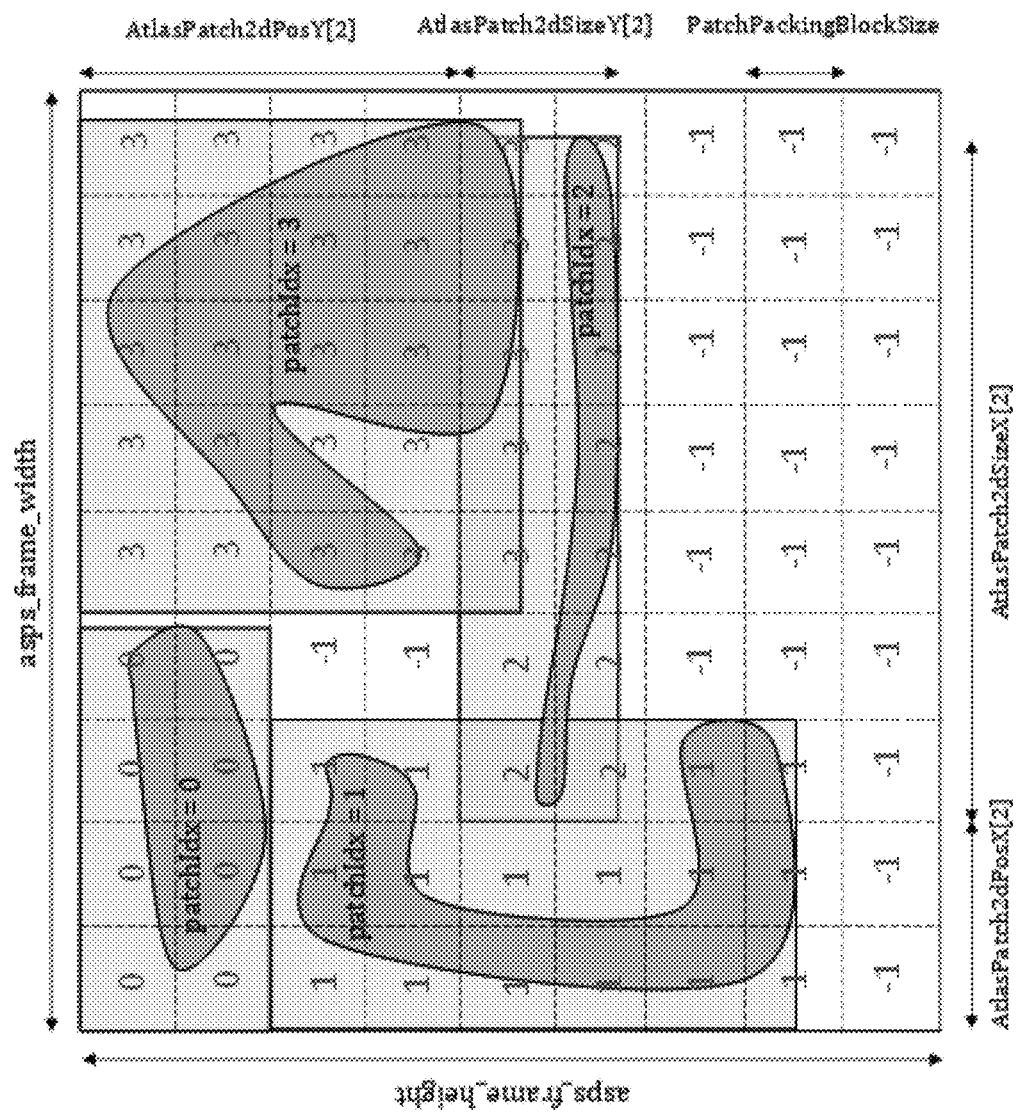
FIG. 5 is a diagram illustrating an atlas containing a collection of patches process according to embodiments of the present invention.

FIG. 5 is a diagram illustrating an atlas containing a collection of patches. For example, the patch arrangement is described in the ISO/IEC JTC 1/SC 29/WG 07 standard. As shown, an atlas is partitioned into patch packing blocks of equal size. The 2D bounding boxes (e.g., top left and lower right corner locations) of patches and their coding order determine the mapping between the blocks of the atlas image and the patch list. FIG. 5 shows block-to-patch mapping with four projected patches onto an atlas when the parameter with the identifier asps_patch_precedence order flag (e.g. a parameter defining patch priority) is equal to 0. Projected points are represented with dark grey. The area that does not contain any projected points is represented with light grey. Patch packing blocks are represented with dashed lines. The number inside each patch packing block represents the patch index of the patch to which it is mapped.

Figure 6A:
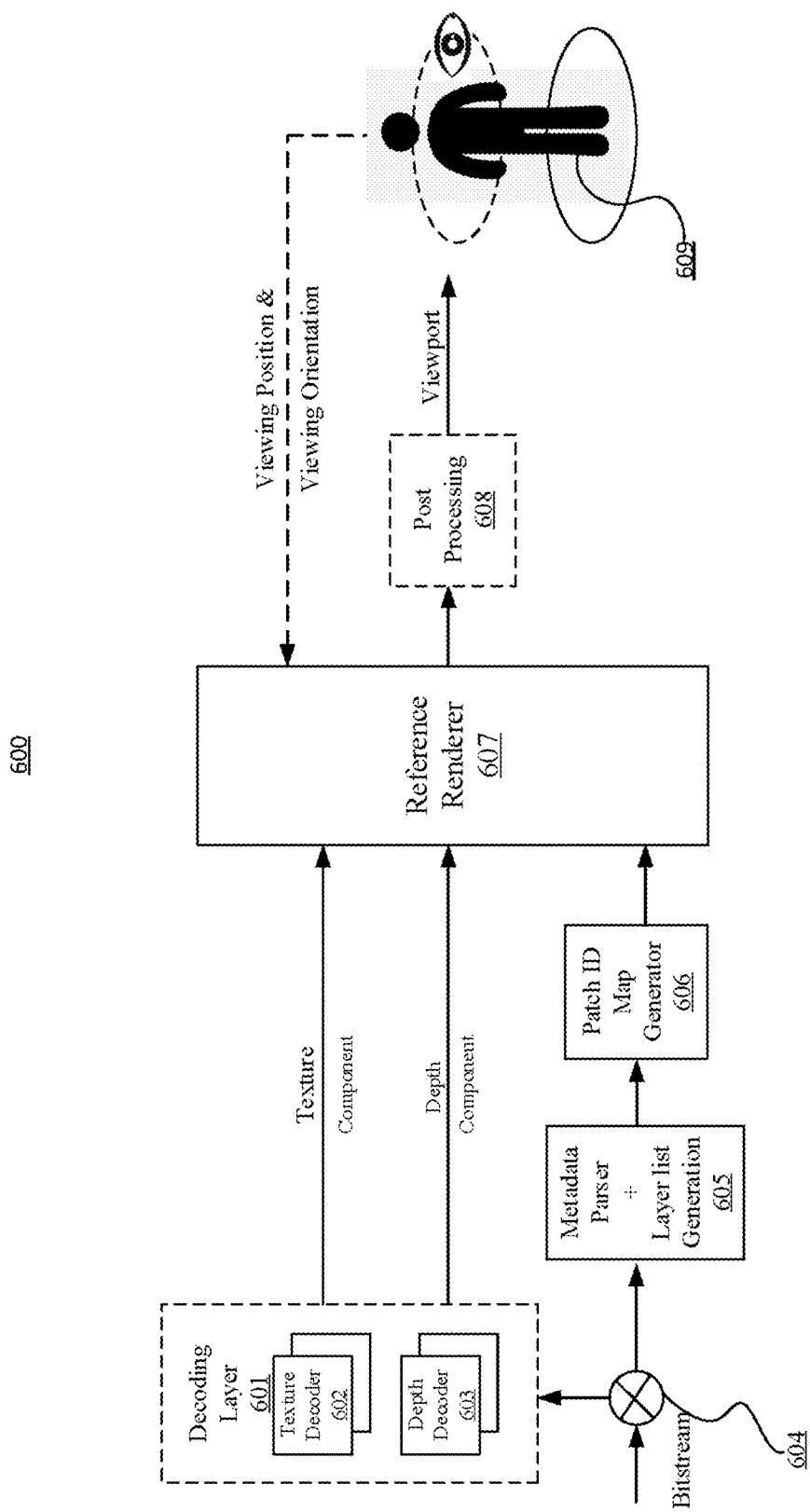
FIG. 6A is a simplified block diagram illustrating a video decoding process according to embodiments of the present invention.

FIG. 6A is a simplified block diagram illustrating video decoding process 600 according to embodiments of the present invention. This diagram is merely an example, which should not unduly limit the scope of the claims. One of ordinary skill in the art would recognize many variations, alternatives, and modifications. A video data stream (e.g., referred to as "Bitstream" in FIG. 6A) is received at node 604. As described above, the video data stream comprises a collection of frames at a predetermined rate (e.g., 24 frames per second, 30 frames per second, etc.). Depending on the specific implementation and operating condition, the frame rate or data rate of the video data stream may not match the output frame rate or data rate. For example, a decoding device processing the video data stream may not have the bandwidth or capacity to process all the contents contained in the video data stream, and certain contents of the video data stream are dropped according to patch priority or layer priority. In a specific implementation, certain contents (e.g., one or more patches) of the video data stream are selectively dropped using a layer ID information defined according to some embodiments: a first patch associated with a first layer that is far away from a target view is deemed lower priority— compared to a second patch with a second layer that is close to the target view—and dropped.

The video data stream, as received at node 604, includes a data section and a metadata section. The data section, which includes patches stored at one or more atlases, is processed at block 601 (e.g., "decoding layer"). The metadata section, which includes at least a view list and a patch list, is processed at block 605. During the process of parsing metadata, a layer list is generated. Using information obtained from the metadata section, a patch ID map is generated at block 606. It is to be appreciated that the metadata section is an important aspect of MIV rendering, which relies on metadata to select patches from atlas(es) to rendering the desired output image. The metadata section of the video data stream, as illustrated in FIG. 3 and described above, includes a view list and a patch list. According to certain embodiments of the present invention, a layer list section is generated and added to the metadata section using at least the layer-patch association information, which is stored as patch parameter metadata during the encoding process. In various embodiments, a layer list is generated and the layers in the layer list are added to the view list section as layer-views. For example, the layer list generated during the decoding process is a "global" layer list, meaning that only the each layer on the layer list is assigned a unique layer ID that is unique to received video stream; this layer list is different from the NAL "layer list" shown in FIG. 4C and serves different purpose.

Figure 7:
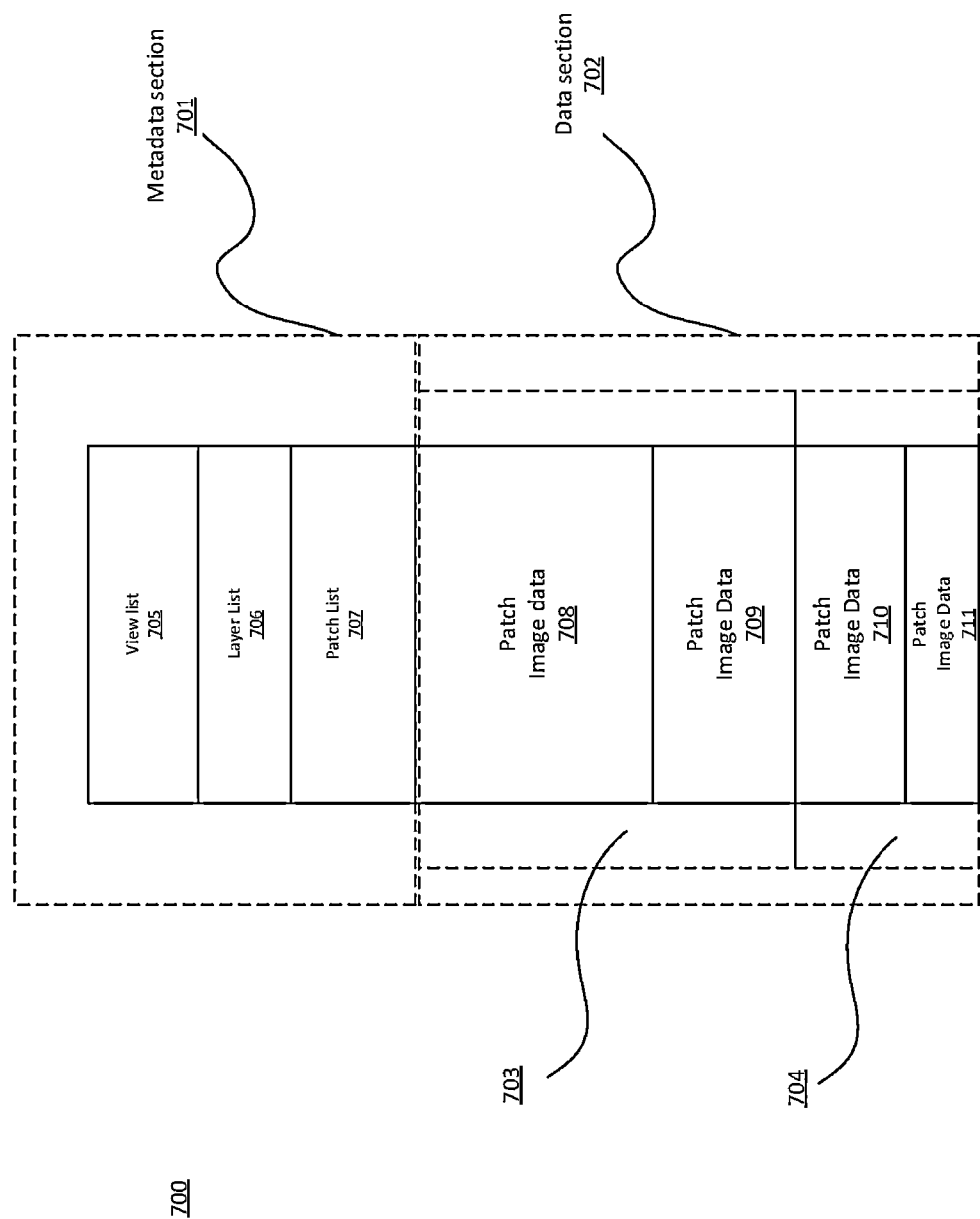
FIG. 7 is a simplified block diagram illustrating a decoding data structure with a layer list section according to embodiments of the present invention.

FIG. 7 is a simplified block diagram illustrating a decoding data structure 700 with a layer list section according to some embodiments. This diagram is merely an example, which should not unduly limit the scope of the claims. One of ordinary skill in the art would recognize many variations, alternatives, and modifications. Decoding data structure 700 is similar to the data structure illustrated in FIG. 3 (e.g., Frame 1/block 319). For example, data structure 700 stores an image frame in a video data stream. Data structure 700 includes a metadata section 701 and a data section 702. Metadata section includes view list section 705, layer list section 706, and patch list section 707. Data section 702 includes atlases 703 and 704. For example, atlas 703 includes patches 708 and 709. As illustrated in FIG. 7, atlases 703 and 704 share layer list section 706 and patch list section 707. Depending on the implementation, each atlas may have its own metadata sections that contain atlas, layer, and patch parameters.

In various implementations, patches are organized and arranged according to their respective priority levels. For example, patch 708 contains more information (e.g., large size, higher resolution, etc.) than patch 709, and as a result patch 708 is assigned a higher priority. Often, the size of atlases is predetermined, and atlas 703 might not be big enough to fit all the patches, and the overflow patches are configured in atlas 704. For example, the number of atlases may vary; an increase in image complexity may translate to an increase in the number of patches and atlases.

Patches, as used in MIV applications, often contain more than just texture information. For example, a patch may also include occupancy, transparency, and depth information. Depending on the implementation, transparency and depth information contain a large amount of data. For example, 16-bit per-pixel depth information may take the same amount of memory as 16-bit luminance information. In various implementations, layer-patch association are stored as patch parameters in the patch list section of the metadata.

Data section 702 contains a large amount of data, and these data become useful only when processed in conjunction with the information stored in the metadata section 701. View list section 705 lists views (e.g., cameras or the types of input devices) that from which videos and images are captured. For example, captured video and image content are sometimes referred to as sample streams. For example, input devices include physical video capture devices (e.g., cameras, cellphones, camcorders, etc.) and graphic generators (e.g., computer graphics, video games engines, augmented reality devices, etc.). Parameters associated with these views include information such as camera information, capture details, and other parameters (e.g., rendering parameters) that can be used in the output rendering process. In various situations, sample streams may include V3C data (or other types of data) that can be used for MIV, and these sample streams are stored with MIV-specific metadata (e.g., as illustrated in FIG. 4C and described above) and depth information (e.g., stored as a depth value). For example, MIV-specific metadata includes layer information associated with sample streams. As illustrated in FIG. 2, the sample streams from view 201 include layers 204, 205, and 206; sample streams from view 202 includes layers 207, 208, and 209.

Layer list section 706 lists the layers with their respective layer IDs and layer-view association. In various embodiments, layer IDs are assigned to layers identified with views. The number of layers is no fewer than the number of views, as each view has at least one layer. For example, the layer list section 706 is generated during the decoding process, during which layer IDs are assigned to layers that are associated with V3C contents and identified in the view list section 705. For example, a parsing algorithm processes each view and/or patches, and assigns a global layer ID to each unique layer, and the global layer IDs are stored at the layer list section 706. In various embodiments, the layer list stored at layer list ction 706 is a "global" layer list, meaning that only the each layer on the layer list is assigned a unique layer ID that is unique to received video stream.

As an example, layer list section 706 can be implemented in the MIV specification (e.g., proposed in ISO/IEC JTC 1/SC 29/WG 4 N00004), and the parameter mvp_num_layers_minus1 [viewID] is associated with the "layer_data_unit" associated with each view. A relevant portion of a modified MIV specification—in according with a specific embodiment of the present invention—is reproduced below:

|  | Descriptor |
|---|---|
| miv_view_params_list( ) { | |
|   mvp_num_views_minus1 | u(16) |
|   mvp_explicit_view_id_flag | u(1) |
|   if( mvp_explicit_view_id_flag ) { | |
|     for( v = 0; v <= mvp_num_views_minus1; v++ ) { | |
|       mvp_view_id[ v ] | u(16) |
|       ViewIDToIndex[ mvp_view_id[ v ] ] = v | |
|       ViewIndexToID[ v ] = mvp_view_id[ v ] | |
|     } | |
|   } else { | |
|     for( v = 0; v <= mvp_num_views_minus1; v++ ) | |
|       mvp_view_id[ v ] = v | |
|       ViewIDToIndex[ mvp_view_id[ v ] ] = v | |
|       ViewIndexToID[ v ] = mvp_view_id[ v ] | |
|     } | |
|   } | |
|   mvp_view_enabled_present_flag | u(1) |
|   if( mvp_view_enabled_present_flag ) { | |
|     for( a = 0; a <= vps_atlas_count_minus1; a++ ) | |
|       for( v = 0; v <= mvp_num_views_minus1; v++ ) { | |
|         atlasID = vps_atlas_id[ a ] | |

|  | Descriptor |
|---|---|
| ```
          viewID = ViewIndexToID[ v ]
          mvp_view_enabled_in_atlas_flag[ atlasID ][ viewID ]
          if( mvp_view_enabled_in_atlas_flag[ atlasID ][ viewID ] )
             mvp_view_complete_in_atlas_flag[ atlasID ][ viewID ]
       }
   }
   for( v = 0; v <= mvp_num_views_minus1; v++ ) {
      viewID = ViewIndexToID[ v ]
      camera_extrinsics( viewID )
   mvp_num_layers_minus1 [viewID ]
          for( 1 = 0; 1 <= mvp_num_layers_minus1; 1++ ) {
          layer_data_unit (viewID , 1 )
   }
   mvp_intrinsic_params_equal_flag
   for( v = 0; v <= mvp_intrinsic_params_equal_flag ? 0 : mvp_num_views_minus1; v++ )
   {
       viewID = ViewIndexToID[ v ]
       camera_intrinsics( viewID, 0 )
   }
   if( came_depth_quantization_params_present_flag ) {
       mvp_depth_quantization_params_equal_flag
       for( v = 0; v <= mvp_depth_quantization_equal_flag ? 0 : mvp_num_views_minus1;
v++) {
          viewID = ViewIndexToID[ v ]
          depth_quantization( viewID )
   }
   mvp_pruning_graph_params_present_flag
   if ( mvp_pruning_graph_params_present_flag )
       for( v = 0; v <= mvp_num_views_minus1; v++ ) {
          viewID = ViewIndexToID[ v ]
          pruning_parents( viewID )
}
   mvp_multiple_layer_in view_present_flag
   if (mvp_multiple_layer_in view_present_flag){
       for( v = 0; v <= mvp_num_views_minus1; v++ ){
viewID = ViewIndexToID[ v ]
mvp_num_layers_minus1[ viewID ]
for( 1 = 0; 1 <= mvp_num_layers_minus1; 1++ )
       layer _information( viewID, 1)
       }
     }
   }
``` | u(1)<br><br><br><br><br><br>u(16)<br><br><br><br>u(1)<br><br><br><br><br><br>u(1)<br><br><br><br><br>u(1)<br><br><br><br><br>u(1)<br><br><br>u(10) |

In the specific embodiment, mvp_multiple_layer_in_view_present_flag equal to 1 indicates that mvp_num_layers_minus1[viewID] syntax element and mvp_layer_id [viewID][layerID] syntax element are present in miv_view_params_list( ) syntax structure. mvp_multiple_layer_in_view_present_flag equal to 0 indicates mvp_num_layers_minus1 [viewID] syntax element and mvp_layer_id [viewID][layerID] syntax element are not present in miv_view_params_list( ) syntax structure. mvp_num_layers_minus1 [viewID] plus 1 indicates the number of layers of the current view, with view ID equal to viewID. in the view list present in the syntax structure. The value of mvp_num_layers_minus1 [viewID] shall be in the range of 0 to 2(asps_geometry_3d_bit_depth_minus1+1)−1, inclusive.

In this modified MIV specification, layer data units are defined below:

|  | Descriptor |
|---|---|
| ```
layer_data_unit (viewID , layerIdx ){
   mvp_layer_id [viewID ][ layerIdx ]
   j= mvp_layer_id [viewID ][ layerIdx ]
   LayerIDtoViewID[j] = viewID
   LayerIDtoIndex[j] = layerIdx
}
``` | <br>u(16) |

In another embodiment, layer data units are defined below:

|  | Descriptor |
|---|---|
| ```
layer_information ( viewID, layerID ) {
   mvp_layer_id[ viewID ][ layerID ]
   LayerIDtoViewID[ mvp_layer_id[ viewID ][ layerID ] ] = viewID
   LayerIDtoLayerIndex[ mvp_layer_id[ viewID ][ layerID ] ] = layerID
}
``` | <br>u(10) | mvp_layer_id [viewID][layerIdx] specifies the ID of the layer with index layerIdx of the current view, with view ID equal to viewID. The value of mvp_layer_id [viewID][layerIdx] shall be in the range of 0 to (mvp_num_views_minus1+1)*(2 (asps_geometry_3d_bit_depth_minus1+1)−1), inclusive. It is a requirement of bitstream conformance to this version of this document that the value of mvp_layer_id[i][j] shall not be equal to mvp_layer_id[k][l] for all i !=k or j !=l.

The arrays LayerIDToViewID and LayerIDtoLayerIndex provide a forward and inverse mapping, respectively, of the ID associated with each layer and the order index of how each layer was specified in the MIV view parameters list syntax.

It is to be appreciated that layer lists and parameters thereof can be used in other video formats and standards as well.

Patch list section 707 lists patches stored in the data section. In addition to the list of patches (in the form of patch ID), patch list section 707 also stores patch parameters. For example, patch parameters include patch boundary (e.g., defined by patch corner positions on an atlas) and patch-view association. For example, the term "patch boundary" is broadly construed, which many include location information such as location, size, angle, and others. As an example, patch-view association may be used to provide identify patches with views; with the use of layer list section 707—where association between views and layers are stored a layer parameters—the patch-layer association information may render patch-view association information redundant and thus removed. Additionally, patch list section 707 includes patch-layer association information, which links the patches to the layers listed under layer list section 706. For example, patch-layer association may be determined during the encoding process.

Figure 8:
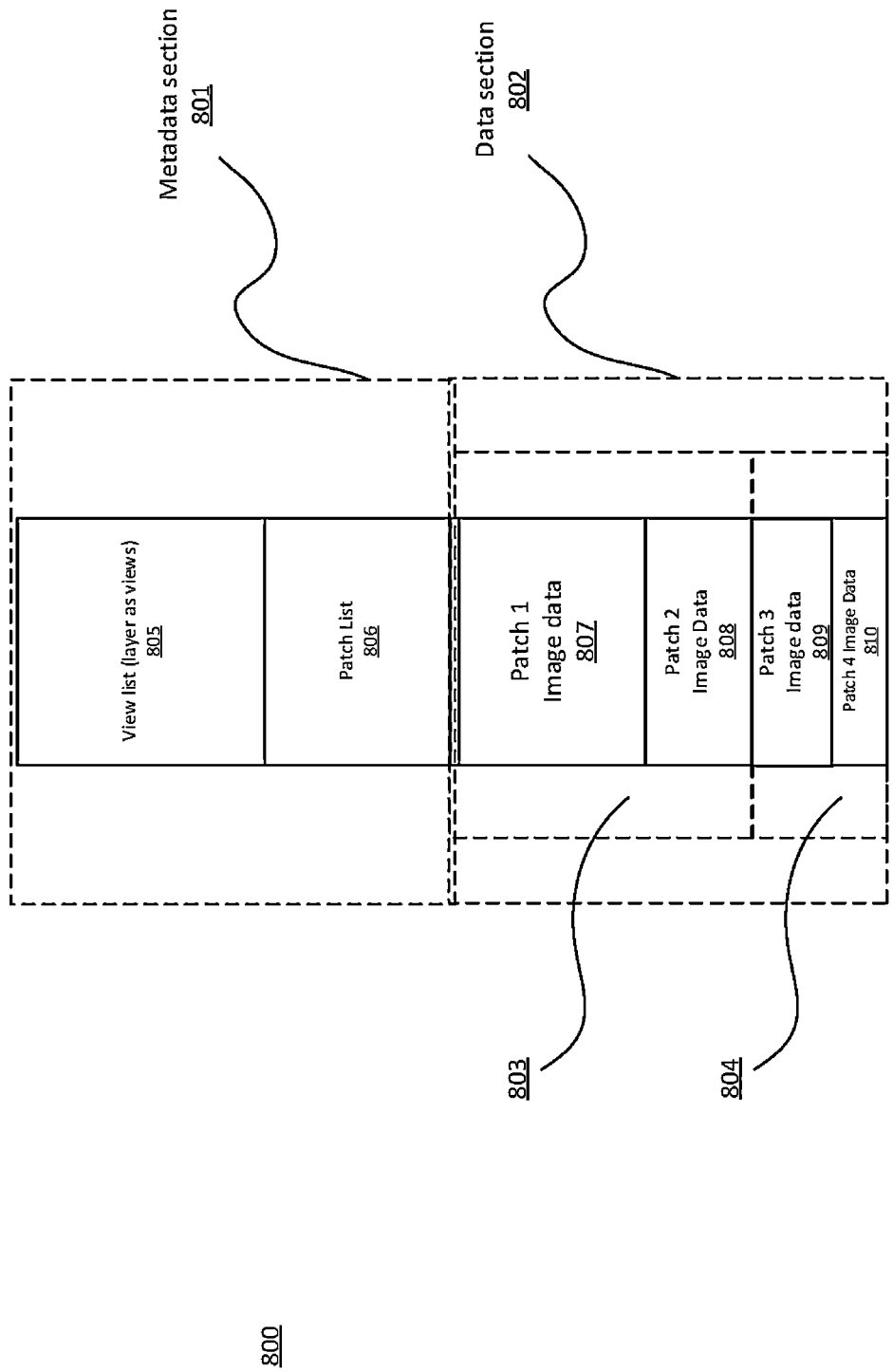
FIG. 8 is a simplified block diagram illustrating a decoding data structure with a modified view list section according to embodiments of the present invention.

FIG. 8 is a simplified block diagram illustrating a decoding data structure 800 with a modified view list section according to some embodiments. This diagram is merely an example, which should not unduly limit the scope of the claims. One of ordinary skill in the art would recognize many variations, alternatives, and modifications. Decoding data structure 800 is similar to the data structure 700 illustrated in FIG. 7. For example, data structure 800 stores an image frame in a video data stream. Data structure 800 includes metadata section 801 and data section 802. Metadata section includes view list section 805 and patch list section 806. Data section 802 includes atlases 803 and 804. For example, atlas 703 includes patches 807 and 808, and atlas 804 includes patches 809 and 810.

As illustrated in FIG. 8, atlases 803 and 804 share the patch list section 806. Depending on the implementation, each atlas may have its own metadata sections that contain atlas, layer, and patch parameters.

When view list section 805 is parsed along with patch list section 806 (e.g., which may contain layer-patch association information), layers associated with their respective views are identified and characterized as layer-views. That is, view list section 805 is updated to includes the newly identified layers as view. For example, to differentiate between layers and views in view list section 805, a "flag" variable is used.

In addition to adding layers as views at view list section 805, patch list section 806 is updated. In addition to storing existing patch parameters (such patch boundary), patch list section 806 is updated to patch parameters indicating the relationship between patches and their respective layers.

As an example, the implementation of the modified view list section 805 can be implemented in the MIV specification (e.g., proposed in ISO/IEC JTC 1/SC 29/WG 4 N00004). For example, parameter "mvp_view_enabled_in_atlas_flag [atlasID][viewID]" indicates that layer-view is enabled, and depth information is quantized as layers. As an example, a relevant portion of a modified MIV specification—in accordance with an alternative embodiment of the present invention—is reproduced below:

|  | Descriptor |
|---|---|
| miv_view_params_list( ) { |  |
|    mvp_num_views_minus1 | u(16) |
|    mvp_explicit_view_id_flag | u(1) |
|    if( mvp_explicit_view_id_flag ) { |  |
|     for( v = 0; v <= mvp_num_views_minus1; v++ ) { |  |
|       mvp_view_id[ v ] | u(16) |
|       ViewIndexToID[ v ] = mvp_view_id[ v ] |  |
|     } |  |
|    } else { |  |
|     for( v = 0; v <= mvp_num_views_minus1; v++ ) |  |
|       mvp_view_id[ v ] = v |  |
|       ViewIDToIndex[ mvp_view_id[ v ] ] =v |  |
|       ViewIndexToID[ v ] = mvp_view_id[ v ] |  |
|     } |  |
|    } |  |
|    mvp_view_enabled_present_flag | u(1) |
|    if( mvp_view_enabled_present_flag ) { |  |
|     for( a = 0; a <= vps_atlas_count_minus1; a++ ) |  |
|       for( v = 0; v <= mvp_num_views_minus1; v++ ) { |  |
|         atlasID = vps_atlas_id[ a ] |  |
|         viewID = ViewIndexToID[ v ] |  |
|         mvp_view_enabled_in_atlas_flag[ atlasID ][ viewID ] | u(1) |
|       if( mvp_view_enabled_in_atlas_flag[ atlasID ][ viewID ] ) |  |
|       mvp_view_complete_in_atlas_flag[ atlasID ][ viewID ] | u(1) |
|     } |  |
|    } |  |
|    for( v = 0; v <= mvp_num_views_minus1; v++ ) { |  |
|     viewID = ViewIndexToID[ v ] |  |
|     camera_extrinsics( viewID ) |  |
|    } |  |
|    mvp_intrinsic_params_equal_flag | u(1) |

|  | Descriptor |
|---|---|
| `        for( v = 0; v <= mvp_intrinsic_params_equal_flag ?0 : mvp_num_views_minus1; v++ ) {` | |
| `            viewID = ViewIndexToID[ v ]` | |
| `            camera_intrinsics( viewID, 0 )` | |
| `        }` | |
| `        if( came_depth quantization_params_present_flag ) {` | |
| `            mvp_depth_quantization_params_equal_flag` | u(1) |
| `            for( v = 0; v <= mvp_depth_quantization_equal_flag ? 0 : mvp_num_views minus1; v++ ) {` | |
| `                viewID = ViewIndexToID[ v ]` | |
| `                depth_quantization( viewID )` | |
| `            }` | |
| `        mvp_pruning graph params present_flag` | u(1) |
| `        if ( mvp_pruning_graph_params_present_flag )` | |
| `            for( v = 0; v <= mvp_num_views_minus1; v++ ) {` | |
| `                viewID = ViewIndexToID[ v ]` | |
| `                pruning_parents( viewID )` | |
| `}` | |
| `    mvp_multiple_layer_in_view_present_flag` | u(1) |
| `    if(mvp_multiple_layer_in view_present_flag){` | |
| `        for( v = 0; v <= mvp_num_views_minus1; v++ ){` | |
| `viewID = ViewIndexToID[ v ]` | |
| `mvp_num_layers_minus1[ viewID ]` | u(10) |
| `for( 1 = 0; 1 <= mvp_num_layers_minus1; 1++ )` | |
| `    layer_information( viewID, 1)` | |
| `        }` | |
| `    }` | |
| `}` | |

Now referring back to FIG. 6A, the rendering process is performed at block 607. As an example, the rendering process starts with selecting one or more target views. For example, a target view refers to a view point of an output display. In various applications—MIV in particular—more than one target views are selected. For example, for a VR device that renders stereoscopic display, two target views resembling the parallax of two eyes are selected, and the two target views are displayed for two eyes. As another example, a "3D" television or projection may superimpose two target views onto the same screen, and the stereoscopic effect is achieved by viewers wearing polarized glasses.

For the selected target view, patches are selected to generate the desired output image. The patch selection process involves processing the patch list and layer list. As explained above, the layer list may be provided in a designated layer section of the metadata section. Alternatively, layers of the layer list may be provided as layer-views in the view list section of the metadata section. The patch list provides, among other things, patch location and patch characteristics. For a given region of the output image, patches corresponding to the region (as defined by the patch parameters) are selected. There might be more than one patch corresponding to this region of the output image, and the layer list can be used to prioritize and select patches for rendering. As explained above, a first patch associated with a first layer that is far away from a target view is deemed lower priority—compared to a second patch with a second layer that is close to the target view—and not selected. It is to be appreciated that depth information inferred from the layer list can improve rendering efficiencies, as patches with low layer-patch priority can be ignored, which translates to less computation, less power consumption, and faster rendering speed.

After patches are selected, the renderer combines these patches to form the output image. For example, the selected patches fill in their corresponding region in the output image. For example, a plurality of patches may be blended and used to fill the same region of the output image. In a specific embodiment, the blending of two (or more) patches involves using layer list information, as the patch associated with the layer closer to the target view is assigned a high weight in the blending process. For example, transparency and depth information stored at the patch data section may be used in the blending process. In various embodiment, the combination (and blending) of selected patches form an intermediate output image, which is stored at a buffer memory (e.g., DRAM of video decoder).

Post processing is performed at block 608. Depending on the application, post processing may include lighting, ambient occlusion (e.g., scalable ambient obscurance, volumetric occlusion, etc.), anti-aliasing, depth of field, color grading, etc. Many post-processing techniques depend on the camera view, and thus rely on the information contained in the view list section. In various embodiments, post processing may rely on certain information contained in the layer list section pertaining to depth value.

After post processing at block 608, the output image (or output images) are presented to viewer 609. For example, output images are generated for and provided to the viewer 609 at a fixed or variable frame rate (e.g., typically over 24 frames per second but capped by the display refresh rate). Viewer 609 may change the target view position (e.g., a head turn detected by a head-mounted VR device), and the updated target view information is used by the render 607 for subsequent rendering.

Figure 6B:
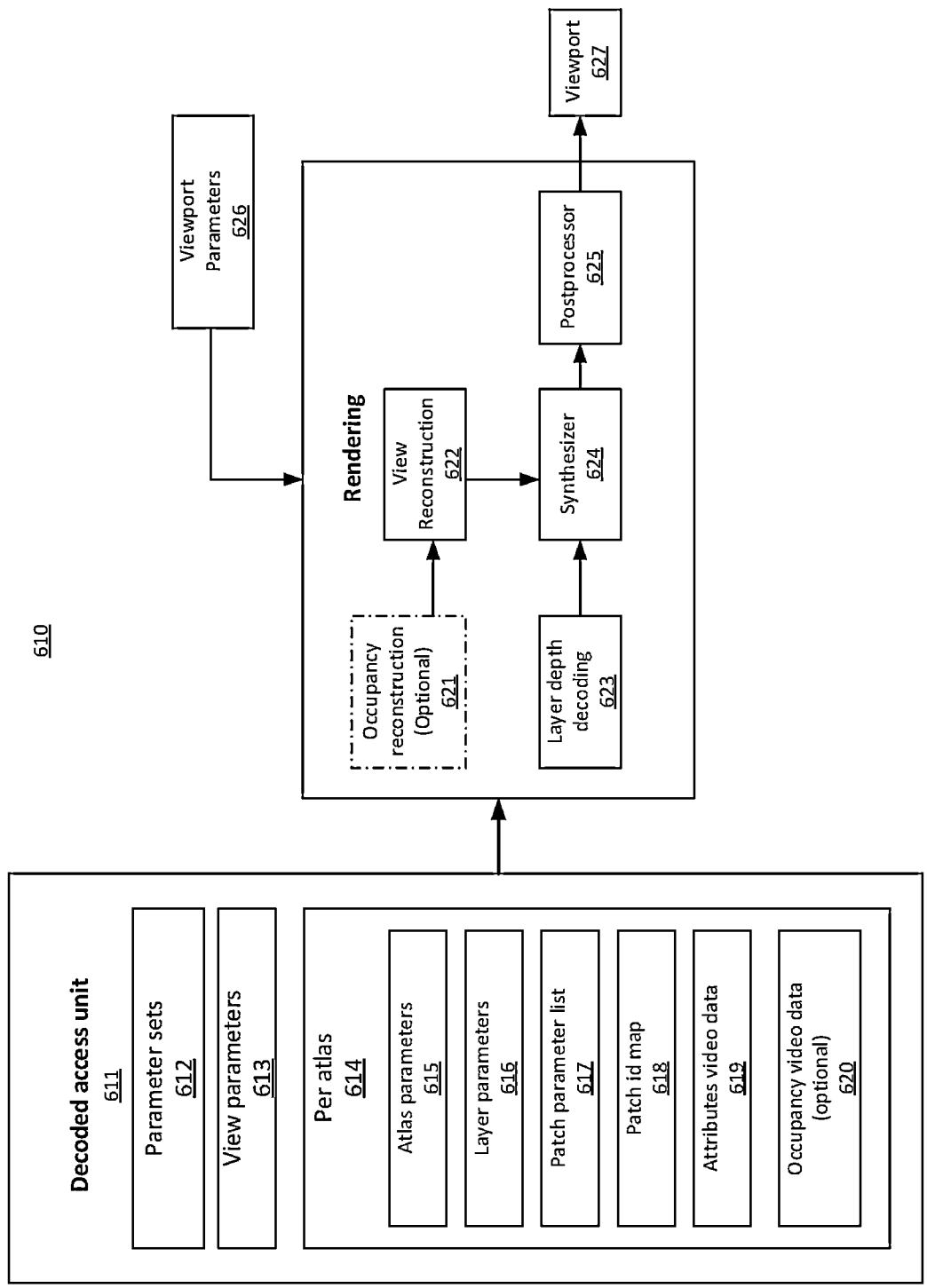
FIG. 6B is a simplified diagram illustrating a video rendering process according to embodiments of the present invention.

FIG. 6B is a simplified diagram illustrating a video rendering process according to embodiments of the present invention. This diagram is merely an example, which should not unduly limit the scope of the claims. One of ordinary skill in the art would recognize many variations, alternatives, and modifications. Decode access unit 611 includes a number of metadata sections as shown. In addition to parameter sets 612 and view parameter 613, unit 611 also includes per-atlas metadata sections. That is, metadata organized and stored for each of the atlases. Atlas metadata 614 includes atlas parameters section 615, layer parameter section 616, patch parameter section 617, patch ID map 618, attribute video data 619, and occupancy video data 620 (may be optional depending on the implementation). For example, occupancy video data 620 includes information as whether a patch occupies a certain location on an atlas. In various embodiments, layer parameters 616 may be based on information contained in view parameters section 613. As explained above, each view (and the video data thereof) may include one or more layers. During a parsing processing, layers from one or more views are enumerated and assigned a global layer ID (i.e., each layer ID is unique). For example, both the layer ID and the association between layers and their respective views are stored as layer parameters in block 616. Layer information, such as the depth value associated with each layer, may also be stored at the layer parameters section 616. Depending on the implementation, layer parameters section 616 may be configured on a per-atlas basis or more "globally" like view parameters section 613. Additionally, the association between layer and patches may also be stored as metadata.

The metadata stored at unit 611 are used during the rendering process. As shown, viewport parameters 626, which may include display specific information, are used during the rendering process as well. As shown layer depth decoding 623 is one of the early steps during the decoding process. For example, at block 623 layer depth is obtained at least from the layer parameters section 616. It is to be appreciated that the layer depth value is useful in many ways; it is faster and requiring fewer calculations to use layer depth—as opposed to depth value of each pixel—during the rendering process. Synthesizer 624 uses the output of block 623, along with output of block 622, to combine patches and generate intermediate video or images for display on the viewport. For example, viewform refers to an output device with one or more target views. During the view reconstruction process, as performed at block 622, occupancy reconstruction process may be performed. For example, synthesizer 624 may use layer information and depth values thereof to combine patches with their associated depth values, thereby generating immersive video or images.

Post processor 625 is configured to use post processing technique to improve output quality, which is to be display at viewport 627. For example, block 625 takes advantage of metadata information stored at unit 611 and improves output quality.

Figure 9:
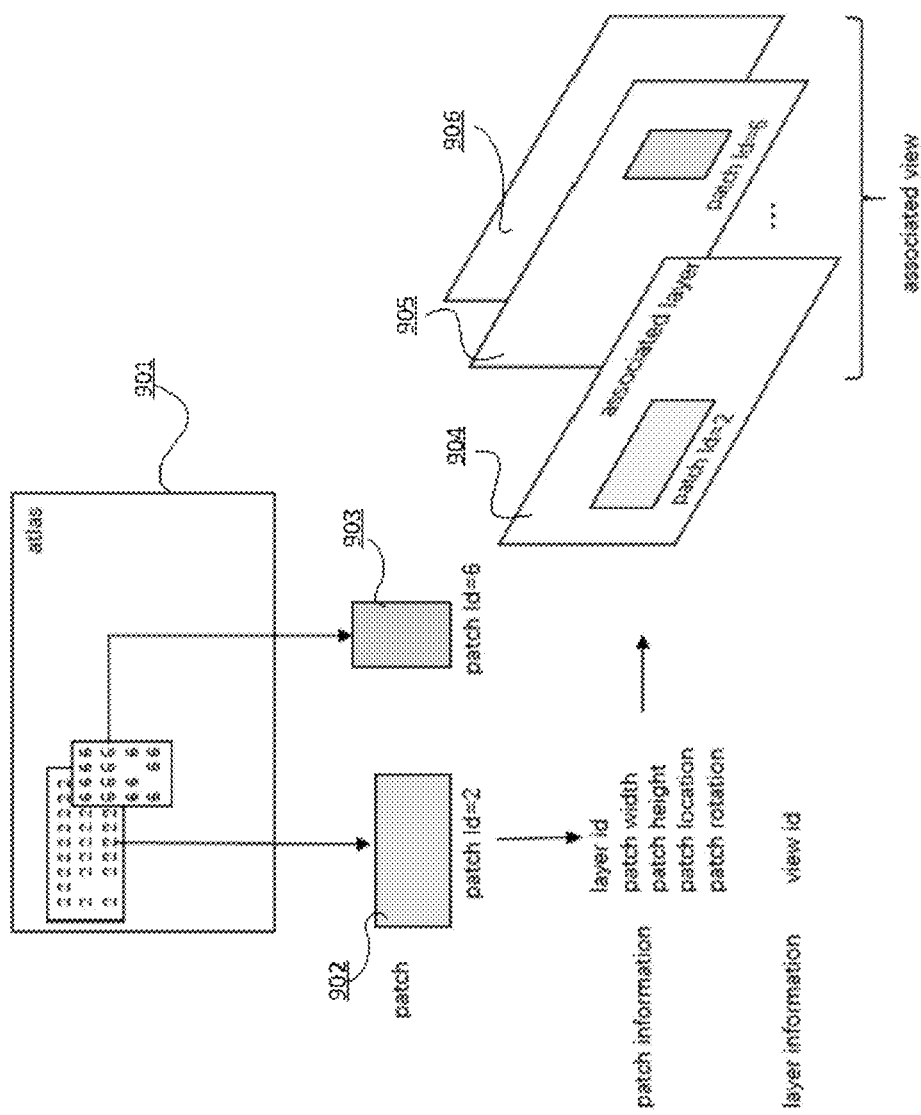
FIG. 9 is a simplified diagram illustrating video rendering using an atlas with layer parameters according to embodiments of the present invention.

FIG. 9 is a simplified diagram illustrating video rendering using an atlas with layer parameters according to embodiments of the present invention. This diagram is merely an example, which should not unduly limit the scope of the claims. One of ordinary skill in the art would recognize many variations, alternatives, and modifications. As shown in FIG. 9, patch 902 and patch 903 are positioned on atlas 901, which functions as a flat placeholder for patches; patch 902 and patch 903 lay flat—on the same plane—on atlas 901. The depth information of patches can be stored and retrieved in different ways. For example, one or more patches on atlas 901 may contain their own depth (and transparency) data in addition to the texture data. Depth information of patches can also be inferred, as described above, by their association with layers. As explained above, patch information is stored as patch parameters metadata. According to various implementations of the present invention, patch parameters include a "layer ID" field that associates the patch to its corresponding layer. In various embodiments, layer IDs are unique and thus can effectively link patches to their views. Layers, as defined according to embodiments of the present invention, can be stored as layer-views in the view section of metadata or layers in the layer section of the metadata. For example, layer parameters include a field that stores the view ID that the layer is associated with. For example, patch 902 is associated with layer 904, and patch 903 is associated with layer 905, which is organized accordingly for their associated view.

Figure 10:
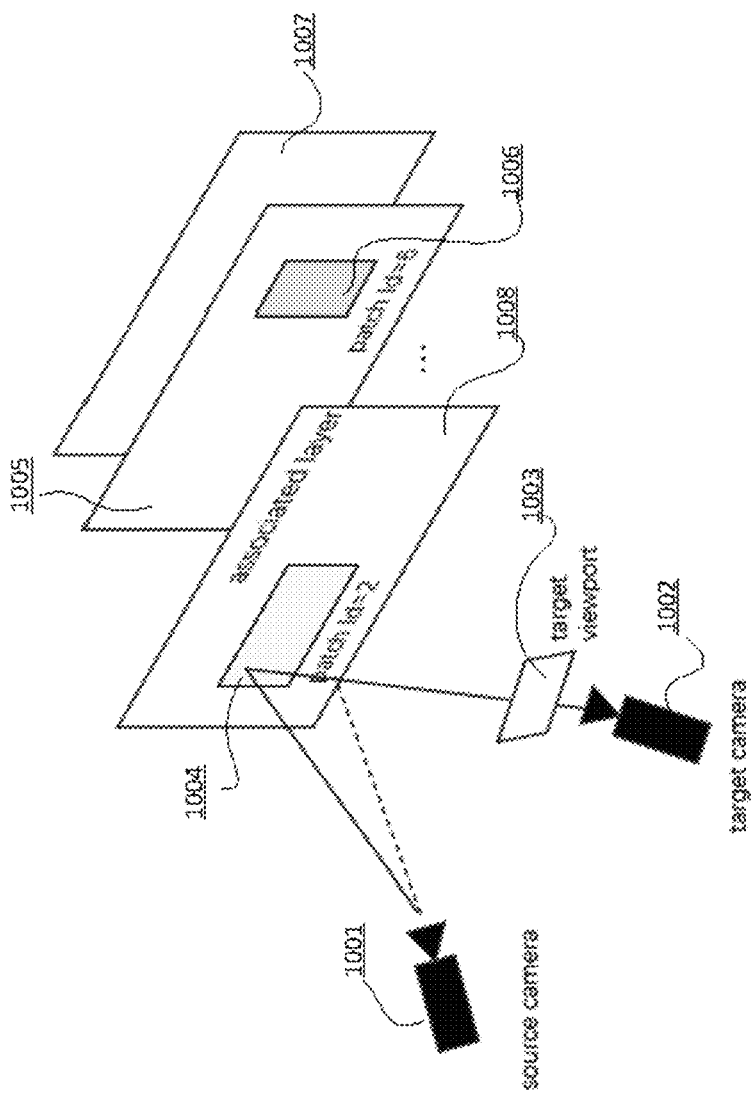
FIG. 10 is a simplified diagram illustrating patches organized according to their layer parameters for rendering according to embodiments of the present invention.

FIG. 10 is a simplified diagram illustrating patches organized according to their layer parameters for rendering according to embodiments of the present invention. This diagram is merely an example, which should not unduly limit the scope of the claims. One of ordinary skill in the art would recognize many variations, alternatives, and modifications. During the rendering process, target view point 1003 is selected for target camera 1002 (i.e., the viewer's camera, representing the viewpoint of the viewer). It is to be noted that the target camera 1002 and the source camera (i.e., the capturing device that generated patch 1004 and patch 1006) are located at different locations. If patch 1004 and patch 1006 are on the same layer, the views of the target camera and the source camera would be substantially the same. However, patch 1004 and patch 1006 being positioned on different layers—enabled by the layer-patch association information stored at the layer list section of the metadata—means that the views of the target and the source cameras are meaningfully different. Views being generated based at on the view position and patch-layer association are useful—and arguably essential—for MIV applications. It is also to be appreciated that the association of a patch to a layer means that the entire patch is associated with the depth value of the layer; there is no need to calculate the depth value for each pixel of this patch. Layer level depth calculation can significantly reduce the amount of calculation, thereby improving decoding and rendering efficiency.

Figure 11:
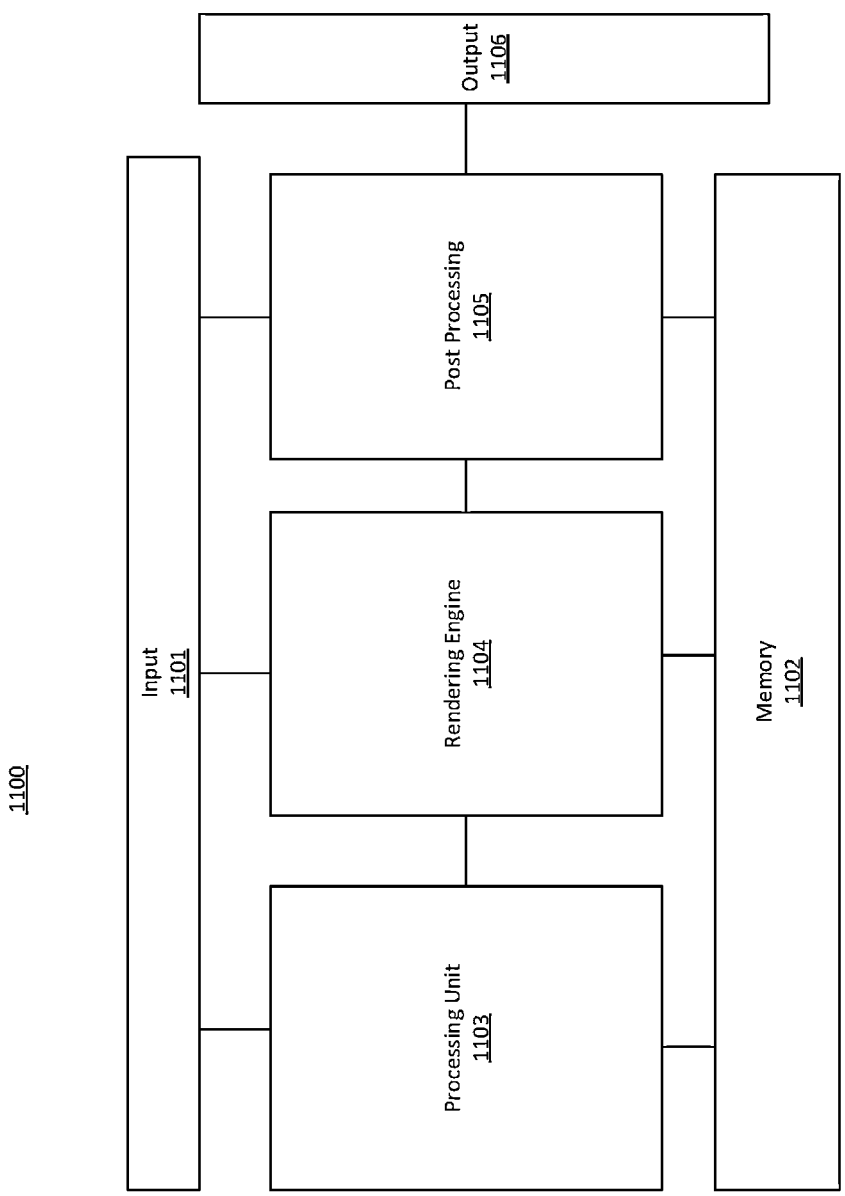
FIG. 11 is a simplified block diagram illustrating a video decoding apparatus according to embodiments of the present invention.

FIG. 11 is a simplified block diagram illustrating a video decoding apparatus 1100 according to embodiments of the present invention. This diagram is merely an example, which should not unduly limit the scope of the claims. One of ordinary skill in the art would recognize many variations, alternatives, and modifications. For example, video decoding apparatus 1100 may be a dedicated video card, a graphic processing unit (GPU), or a dedicated decoder. Video data streams are received via input interface 1101. For example, input interface 1101 may be a host bus interface. The received video stream may be stored at an input buffer memory. In various embodiments, the received video stream is stored at a predetermined region of memory 1102. For example, memory 1102 comprises fast DDR memory with high bandwidth.

For example, the received video data stream may be in MIV format and includes a firsts data unit, which has a metadata section and a data section. The metadata section includes a view list section and a patch list section. The data section includes a first atlas, which contains a first patch and a second patch. The view list section includes a first view and a first plurality of view parameters associated with the first view. The patch list section contains a first plurality of patch parameters associated with the first patch and a second plurality of patch parameters associated with the second patch.

The processing unit 1103 is configured to access the video stream stored at the buffer memory. For example, processing unit 1103 is coupled to memory 1102, where the video stream may be stored. The processing unit parses the metadata section and using the information obtained from metadata section (e.g., depth/layer information associated with video contents) to add a layer list section. The layer list section including a first layer and first plurality of layer parameters. The first layer is associated with the first view. The processing unit 1103 also modifies the first plurality of patch parameters to include a first layer-patch parameter (i.e., associating patch ID with layer ID) to indicate the association between the first layer and the first patch.

The rendering engine 1104 is configured to select a first target view and generate a first intermediate output image for the first target view. For example, the first target view may be determined by user input (e.g., view selection, moving a head-mounted VR display, etc.). The first intermediate output image is associated with the firsts data unit. The rendering engine 1104 selects and combines one or more patches for the first target view based at least on the layer list section. The first intermediate output image is generated by combining one or more patches. It is to be appreciated that during the patch selection and combination processes, one or more patches may be ignored or partially ignored to save computational resources, as warranted by certain use-case scenarios.

It is to be understood the process of "combining" patches for the intermediate output image can be an involved process. For true 3D rendering, depth values are calculated on a per-pixel basis. However, the use of layer information, as afforded by certain embodiments, can substantially reduce the number of depth calculations, as the depth value of a layer is assigned to every pixel of the corresponding patch.

The intermediate output image is stored at a buffer memory. For example, memory 1102 may be used to store the intermediate output image. Post-processing engine 1105 is configured to perform additional processes to improve video quality. For example, post processing may include lighting, ambient occlusion (e.g., scalable ambient obscurance, volumetric occlusion, etc.), anti-aliasing, depth of field, color grading, etc. In various embodiments, post-processing algorithms are embedded into the hardware of the post-processing engine 1105. After post-processing, the processed video content is transmitted via the output interface 1106. For example, the output interface may be display port, HDMI interface, DVI interface, Thunderbolt, and others.

Figure 12:
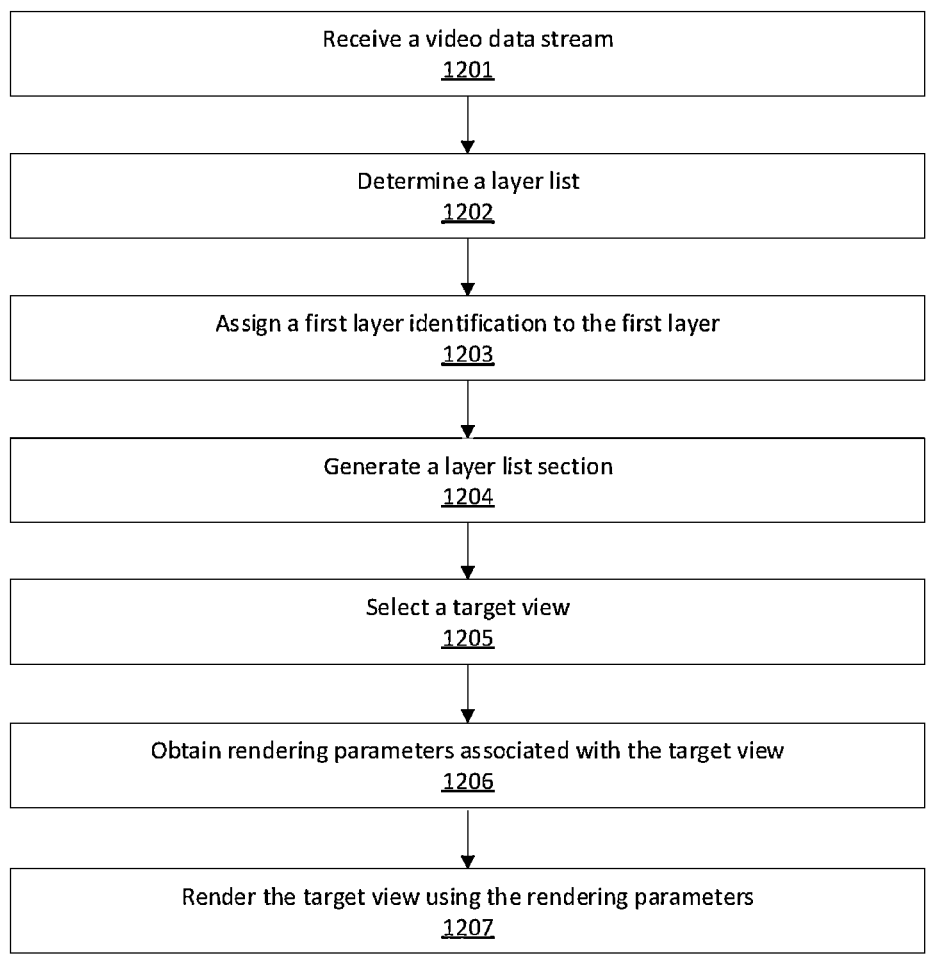
FIG. 12 is a simplified flow diagram illustrating a video processing method that generates a layer list metadata section according to embodiments of the present invention.

FIG. 12 is a simplified flow diagram illustrating a video processing method 1200 that generates a layer list metadata section according to embodiments of the present invention. This diagram is merely an example, which should not unduly limit the scope of the claims. One of ordinary skill in the art would recognize many variations, alternatives, and modifications. As an example, one or more of the steps may be added, removed, repeated, rearranged, overlapped, and modified, and should not limit the scope of claims.

At step 1201, a video data stream is received. For example, the received video data stream may be in MIV format and includes a first data unit which has a metadata section and a data section. The metadata section includes a view list section and a patch list section. The data section includes a first atlas, which contains a first patch and a second patch. The view list section includes a first view and a first plurality of view parameters associated with the first view. The patch list section contains a first plurality of patch parameters associated with the first patch and a second plurality of patch parameters associated with the second patch. For example, the first plurality of patch parameters includes patch-layer association information.

At step 1202, a layer list is determined using at least the view list section and the patch-layer association information. The layer list may be generated based on the information stored in the view list section. For example, the layer list can be determined through parsing the metadata section and using the information obtained from metadata section (e.g., depth/layer information associated with video contents). The layer list includes a first layer associated with the first view. For example, the first layer is based on a first depth of the first view.

At step 1203, a first layer identification is assigned to the first layer.

At step 1204, a layer list section is generated. The layer list section includes at least the first layer and a first plurality of layer parameters associated with the first layer. The first plurality of layer parameters includes a first layer identification number and a first view-layer association. According to certain embodiments of the present invention, the layer list section is added to the metadata section.

At step 1205, a target view is selected from the view list section using at least the first layer. For example, a target view may be a viewpoint of an output display, such as a MIV display device, a mobile display, a projector, or a stereoscopic display, etc. According to certain embodiments, more than one target views can be selected.

At step 1206, rendering parameters associated with the target view are obtained.

At step 1207, the target view is rendered using the rendering parameters.

Figure 13:
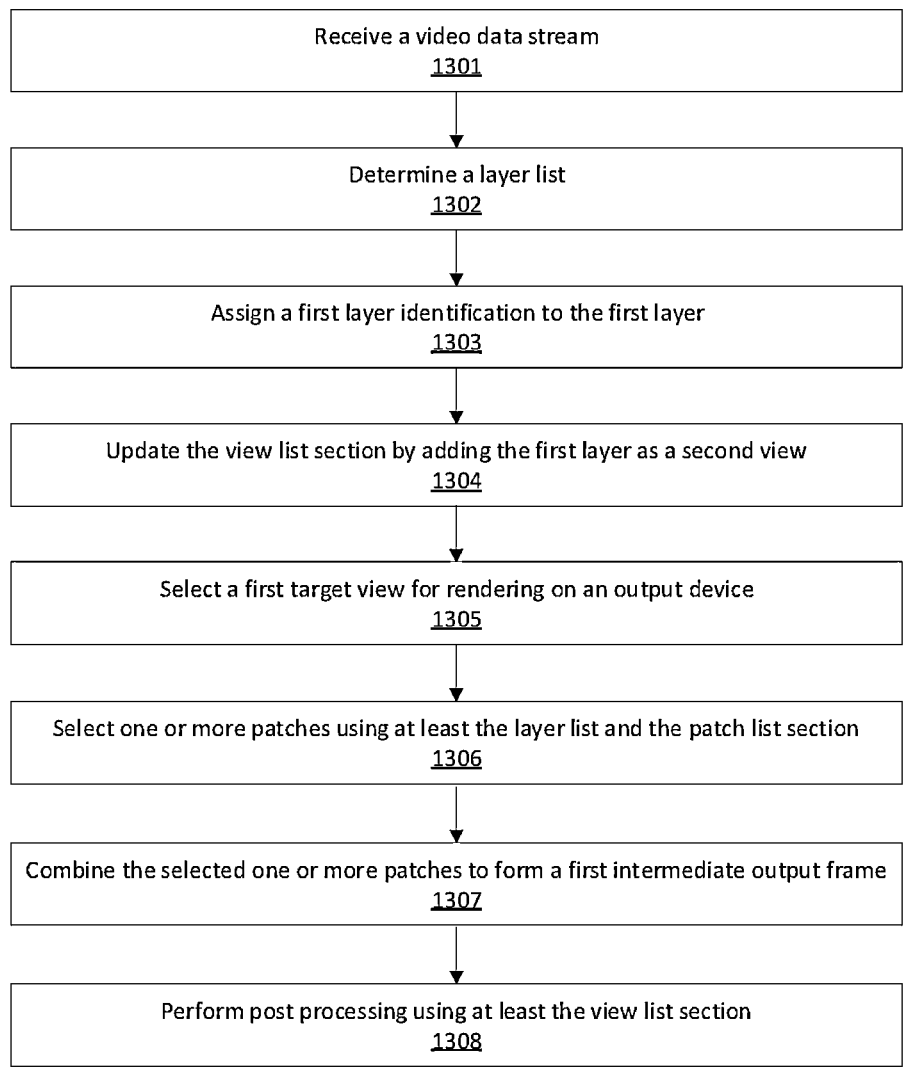
FIG. 13 is a simplified flow diagram illustrating a video processing method that modify a view list metadata section according to embodiments of the present invention.

FIG. 13 is a simplified flow diagram illustrating a video processing method 1300 that modify a view list metadata section according to embodiments of the present invention. This diagram is merely an example, which should not unduly limit the scope of the claims. One of ordinary skill in the art would recognize many variations, alternatives, and modifications. As an example, one or more of the steps may be added, removed, repeated, rearranged, overlapped, and modified, and should not limit the scope of claims.

At step 1301, a video data stream is received. For example, the received video data stream may be in MIV format and includes a first data unit which has a metadata section and a data section. The metadata section includes a view list section and a patch list section. The data section includes a first atlas, which contains a first patch and a second patch. The view list section includes a first view and a first plurality of view parameters associated with the first view. The patch list section contains a first plurality of patch parameters associated with the first patch and a second plurality of patch parameters associated with the second patch. For example, the first plurality of patch parameters includes patch-layer association information.

At step 1302, a layer list is determined using at least the view list section and the patch-layer association information. The layer list may be generated based on the information stored in the view list section. For example, the layer list can be determined through parsing the metadata section and using the information obtained from metadata section (e.g., depth/layer information associated with video contents). The layer list includes a first layer associated with the first view. For example, the first layer is based on a first depth of the first view.

At step 1303, a first layer identification is assigned to the first layer.

At step 1304, the view list section is updated by adding the first layer as a second view. For example, the second view includes a flag parameter indicating the second view being a layer-view type.

At step 1305, a first target view for rendering on an output device is selected. The first target view may be a viewpoint of an output display. For example, the first target view may be determined by user input (e.g., view selection, moving a head-mounted VR display, etc.). According to certain embodiments, more than one target views can be selected.

At step 1306, one or more patches are selected using at least the layer list and the patch list section. The patch selection process involves processing the patch list and the layer list. For example, layers of the layer list may be provided as layer-views in the view list section of the metadata section.

At step 1307, the selected one or more patches are combined to form a first intermediate output frame. For example, the first intermediate output image is associated with the first data unit and is based on the combined one or more patches. In various applications, one or more patches may be ignored or partially ignored to save computational resources, as warranted by certain use-case scenarios.

At step 1308, performing post processing using at least the view list section. For example, the first intermediate image may be modified using at least the first plurality of view parameters during post processing. Post processing may improve video quality. For example, post processing may include lighting, ambient occlusion (e.g., scalable ambient obscurance, volumetric occlusion, etc.), anti-aliasing, depth of field, color grading, etc.

Figure 14:
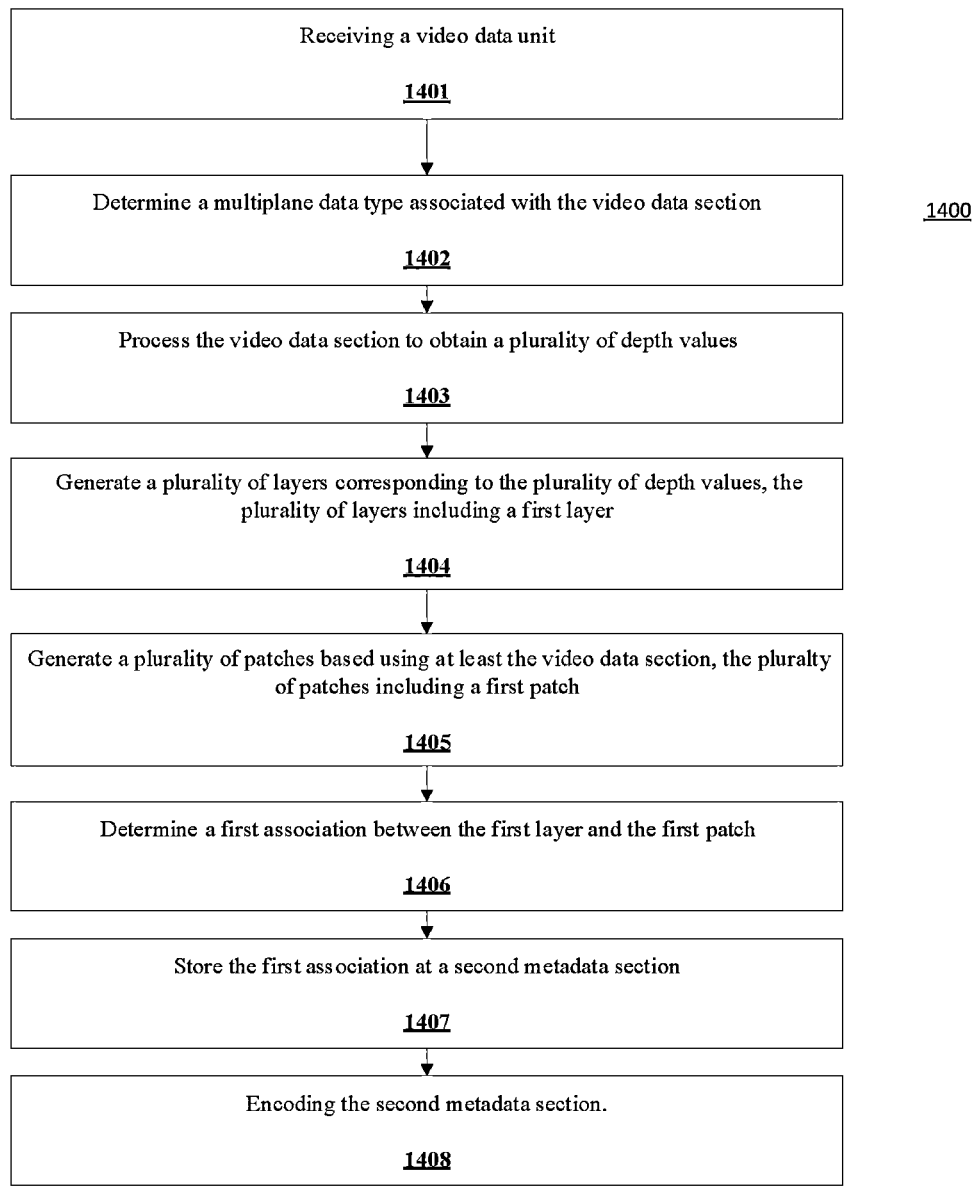
FIG. 14 is a simplified flow diagram illustrating a video encoding method 1400 according to embodiments of the present invention.

FIG. 14 is a simplified flow diagram illustrating a video encoding method 1400 according to embodiments of the present invention. This diagram is merely an example, which should not unduly limit the scope of the claims. One of ordinary skill in the art would recognize many variations, alternatives, and modifications. As an example, one or more of the steps may be added, removed, repeated, rearranged, overlapped, and modified, and should not limit the scope of claims.

At stet 1401, a video data unit is received. For example, the video data unit is generated by a content generation device, which may be video camera, a computer game, or others. The video data unit includes a first metadata section and a video data section. The first metadata section includes at least view parameters. For example, view parameters may include camera or view specific information that can be useful later during the rendering processes.

At step 1402, a multiplane data type associated with the video data section is determined. For example, multiplane data type could be MPI or LDI data type. In various embodiments, the multiplane data type can be determined by the depth values of the video content.

At step 1403, the video data section is processed to obtain a plurality of depth values. In various embodiments, the video data section is processed at a part of MIV encoding processs, during which depth values—along with other information such as texture information—are obtained and processed accordingly.

At step 1404, a plurality of layers corresponding to the plurality of depth values is generated. For example, each of the layer is associated with a depth range. In various embodiments, depth of a layer is calculated by averaging upper and lower limits of its corresponding depth range. Each view is associated with at least a single layer; a single plane video content is associated with a single layer. The plurality of layers includes a first layer.

At step 1405, a plurality of patches is generated based using at least the video data section. The plurality of patches includes a first patch. For example, the patches are generated during an atlas construction process, in which video content is pruned and aggregated, and patches are generated.

At step 1406, a first association between the first layer and the first patch is determined.

At step 1407, the first association is stored at a second metadata section. For example, the second metadata section is generated in conjunction with the newly generate atlas(es). In various embodiments, the second metadata section stores view and patch parameters in view list section and patch sections.

At step 1408, the second metadata section is encoded. Depending on the implementation, various types of encoding mechanisms may be used. For example, HEVC may be used to encode the second metadata section and the atlas(es).

Depending on the intended output device, more than one target view image may be generated. For example, VR display involves simultaneously displaying two images (with a parallax offset corresponding to human eyes). Apparatus 1100 may be configured to perform v simultaneous video rendering computations using multiple physical processors (e.g., cores) or virtual processors (e.g., logical processors). The use of layer parameters can significantly reduce the amount of calculation needed. Alternatively, using the same amount of computational resources, layer parameters as defined according to embodiments of the present invention can meaningfully improve video rendering quality.

While the above is a full description of the specific embodiments, various modifications, alternative constructions and equivalents may be used. Therefore, the above description and illustrations should not be taken as limiting the scope of the present invention which is defined by the appended claims.

The invention claimed is:

1. A method for processing a video data stream, the method comprising:
   receiving a video data stream, the video data stream including a first data unit, the first data unit including a metadata section and a data section, the metadata section including a view list section and a patch list section, the data section including a first atlas, the first atlas including a first patch and a second patch, the view list section including a first view and a first plurality of view parameters associated with the first view, the patch list section including a first plurality of patch parameters associated with the first patch and a second plurality of patch parameters associated with the second patch, the first plurality of patch parameters including patch-layer association information;
   generating a layer list using at least the patch-layer association information, the layer list including a first layer associated with the first view, the first layer being based on a first depth of the first view;
   assigning a first layer identification to the first layer;
   updating the view list section by adding the first layer as a second view;
   selecting a first target view for rendering on an output device;
   selecting one or more patches using at least the layer list and the patch list section;
   combining the selected one or more patches to form a first intermediate output frame; and
   performing post processing using at least the view list section.

2. The method of claim 1, wherein the second view comprises a flag parameter indicating the second view being a layer-type view.

3. A video decoding apparatus comprising:
   an input interface configured to receive a video data stream;

a first buffer memory for storing a first data unit of the video data stream, the first data unit including a metadata section and a data section, the metadata section including a view list section and a patch list section, the data section including a first atlas, the first atlas including a first patch and a second patch, the view list section including a first view and a first plurality of view parameters associated with the first view, the patch list section including a first plurality of patch parameters associated with the first patch and a second plurality of patch parameters associated with the second patch, the first plurality of patch parameters including patch-layer association information;

a processor configured to access the first buffer memory and process the metadata section to add a layer list section using at least the patch-layer association information, the layer list section including a first layer and first plurality of layer parameters, the first layer being associated with the first view, the processor is further configured to assign a first layer identification to the first layer;

a rendering engine configured to select a first target view and generate a first intermediate output image for the first target view, the first intermediate output image being associated with the first data unit, the rendering engine further being configured to select and combine one or more patches for the first target view based at least on the layer list section, the first intermediate output image being based on combined one or more of the patches;

a second buffer memory configured to store the first intermediate output image; and an output interface configured to transmit the first intermediate output image.

4. The apparatus of claim 3, wherein the rendering engine is configured to operate at an increased frame rate by rendering the first patch using a layer-level depth value, the layer-level depth value being associated with the first layer.

5. The apparatus of claim 3, wherein the rendering engine is configured to ignore pixel-level depth values of the first patch.

6. The apparatus of claim 3, wherein the data section further includes a second atlas, the processor being configured to process the first atlas and the second atlas simultaneously.

7. The apparatus of claim 3, wherein the rendering engine comprises a 3D engine for generating an MIV image using the selected patches.

8. The apparatus of claim 3, wherein the rendering engine is further configured to generate a second target view and generate a second intermediate output image, the first intermediate output image and the second intermediate output image being associated with the first data unit.

9. The apparatus of claim 8, wherein the output interface is coupled to a stereoscopic display configured to superimpose the first intermediate output image and the second intermediate output image to provide a stereoscopic image.

10. The apparatus of claim 8, wherein the output interface is coupled to a VR device configured to display the first intermediate output image and the second intermediate output image on two separate output screens.

11. The apparatus of claim 3, wherein the render engine is further configured to ignore a portion of the second patch based on a relative position between the first patch and the second patch determined based at least on the layer list section.

12. The apparatus of claim 3, wherein the rendering engine is configured to prioritize a patch selection for the first intermediate output image based at least on the layer list section.

13. The apparatus of claim 3, wherein the processor is configured with a plurality of processing cores, the plurality of processing cores being configured to process the first atlas and a second atlas in parallel, the second atlas being configured at a second region of the data section.

14. The apparatus of claim 3, wherein the output interface is coupled to a display device.

15. The apparatus of claim 3, wherein the input interface comprises a first video card bus interface.

16. The apparatus of claim 3, further comprising a video graphic card.

17. The apparatus of claim 3, wherein the interface comprises a system bus coupled to an external video source.

18. The apparatus of claim 3, comprising a volatile memory, the first buffer memory being configured at a first region of the volatile memory, the second buffer memory being configured at a second region of the volatile memory.

19. The apparatus of claim 3, further comprising a post processor configured to modify the first intermediate output image based on at least the first plurality of view parameters.

20. A method for encoding data stream comprising:
receiving a video data unit, the video data unit comprising a first metadata section and a video data section, the first metadata section including at least view parameters;
determining a multiplane data type associated with the video data section;
processing the video data section to obtain a plurality of depth values;
generating a plurality of layers corresponding to the plurality of depth values, the plurality of layers including a first layer;
generating a plurality of patches based using at least the video data section, the plurality of patches including a first patch;
determining a first association between the first layer and the first patch;
storing the first association at a second metadata section; and
encoding the second metadata section.

* * * * *